US012755475B2

(12) United States Patent
Agrawala et al.

(10) Patent No.: US 12,755,475 B2
(45) Date of Patent: Oct. 6, 2026

(54) VIEW CONSISTENT TEXTURE GENERATION FOR THREE DIMENSIONAL OBJECTS

(71) Applicant: Roblox Corporation, San Mateo, CA (US)

(72) Inventors: Maneesh Agrawala, San Mateo, CA (US); Tinghui Zhou, San Mateo, CA (US); Timothy Paul Omernick, San Diego, CA (US); Alexander B. Weiss, Pleasanton, CA (US); Kangle Deng, San Mateo, CA (US); Benjamin Akrish, San Mateo, CA (US); Victor B. Zordan, Riverside, CA (US)

(73) Assignee: Roblox Corporation, San Mateo, CA (US)

( * ) Notice: Subject to any disclaimer, the term of this patent is extended or adjusted under 35 U.S.C. 154(b) by 99 days.

(21) Appl. No.: 18/826,611

(22) Filed: Sep. 6, 2024

(65) Prior Publication Data

US 2025/0086876 A1 Mar. 13, 2025

Related U.S. Application Data

(60) Provisional application No. 63/537,115, filed on Sep. 7, 2023.

(51) Int. Cl.

| | |
|---|---|
| ***G06T 15/04*** | (2011.01) |
| ***G06T 15/20*** | (2011.01) |
| ***G06T 17/20*** | (2006.01) |

(52) U.S. Cl.
CPC .............. *G06T 15/04* (2013.01); *G06T 15/20* (2013.01); *G06T 17/20* (2013.01)

(58) Field of Classification Search
CPC ......... G06T 15/04; G06T 15/20; G06T 17/20; G06T 19/20; G01S 17/08; G01S 17/10;
(Continued)

(56) References Cited

U.S. PATENT DOCUMENTS

| | | | | |
|---|---|---|---|---|
| 2005/0248560 A1* | 11/2005 | Agrawala | ............... | G06T 19/00 345/418 |
| 2018/0218535 A1* | 8/2018 | Ceylan | ...................... | G06T 7/90 |

(Continued)

OTHER PUBLICATIONS

Chen, et al., "Fantasia3d: Disentangling geometry and appearance for high-quality text-to-3d content creation", Proceedings of the IEEE/CVF International Conference on Computer Vision, 2023, 11 pages.

(Continued)

*Primary Examiner* — Ming Wu
(74) *Attorney, Agent, or Firm* — IP Spring

(57) ABSTRACT

Various implementations relate to methods, systems, and computer-readable media to generate view consistent textures for three-dimensional (3D) objects. In some implementations, a method includes generating a plurality of depth maps based on a 3D mesh of a 3D object, wherein each of the plurality of depth maps is associated with a respective view of the 3D object. The method further includes receiving a description of a texture and generating two or more views of a texture map for the 3D object with a generative machine-learning (genML) model. The plurality of depth maps and a text prompt based on the description are provided as input to the genML model. Each view of the texture map at least partially covers the 3D mesh. The method further includes combining the two or more views of the texture map based on the 3D mesh to obtain the texture map for the 3D object.

20 Claims, 14 Drawing Sheets

(58) Field of Classification Search
CPC .......... G01S 17/46; G01S 17/48; G01S 17/88; G01S 17/931; G06K 19/06018; G06K 19/06028; G06K 7/10861
See application file for complete search history.

(56) References Cited

U.S. PATENT DOCUMENTS

2020/0279387 A1* 9/2020 Zhang ................. G06F 18/2155
2020/0280429 A1* 9/2020 Su ......................... G01S 13/867

OTHER PUBLICATIONS

Lin, et al., "Magic3d: High-resolution text-to-3d content creation", Proceedings of the IEEE/CVF Conference on Computer Vision and Pattern Recognition, 2023, 10 pages Metzer, et al., "Latent-nerf for shape-guided generation of 3d shapes and textures", Proceedings of the IEEE/CVF Conference on Computer Vision and Pattern Recognition, 2023, 11 pages.

Poole, et al., "Dreamfusion: Text-to-3d using 2d diffusion", arXiv preprint arXiv:2209.14988, 2022, 18 pages.

Rombach, et al., "High-resolution image synthesis with latent diffusion models", Proceedings of the IEEE/CVF conference on computer vision and pattern recognition, 2022, 12 pages.

Zhang, et al., "Adding conditional control to text-to-image diffusion models", Proceedings of the IEEE/CVF International Conference on Computer Vision, 2023, 12 pages.

"ControlNet," Retrieved from Internet: https://github.com/Illyasviel/ControlNet-v1-1-nightly, 2023, 44 pages.

"Diffusers," Retrieved from Internet: https://huggingface.co/docs/diffusers/index, 2023, 2 pages.

"Stable Dreamfusion," Retrieved from Internet: https://github.com/ashawkey/stable-dreamfusion, 2023, 8 pages.

"Threestudio," Retrieved from Internet: https://github.com/threestudio-project/threestudio, 2023, 21 pages.

* cited by examiner

VIEW CONSISTENT TEXTURE GENERATION FOR THREE DIMENSIONAL OBJECTS

CROSS-REFERENCE TO RELATED APPLICATIONS

This application claims priority to U.S. Provisional Application No. 63/537,115, entitled "MESH STYLIZATION BASED ON NATURAL LANGUAGE PROMPTS," filed on Sep. 7, 2023, the content of which is incorporated herein in its entirety.

TECHNICAL FIELD

Embodiments relate generally to computer-based virtual experiences and computer graphics, and more particularly, to methods, systems, and computer readable media to generate view-consistent textures for three-dimensional (3D) objects that are rendered on computing devices.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters, three-dimensional (3D) objects, and avatars, decorate avatars, and exchange virtual items/objects with other users.

One of the challenges in computer graphics is texture creation for untextured meshes. Content creators (developers) may be provided with a coarse mesh as a starting point, from which they have to create texture maps and/or refine geometry details to achieve an intended level of intricacy and uniqueness. Moreover, in certain scenarios, such as in game development or in projects that benefit from uniform visual styles, creators may also be required to ensure that the stylized mesh aligns seamlessly with the global style or environment. However, this process can be time-consuming and arduous, thereby impeding the creators' ability to efficiently stylize and bring out the full artistic potential of the mesh.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the prior disclosure.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to generate view-consistent textures for three-dimensional (3D) objects that are rendered on computing devices. The computer-implemented method may include generating a plurality of depth maps based on a three-dimensional (3D) mesh of a three-dimensional (3D) object, wherein each of the plurality of depth maps is associated with a respective view of the 3D object, receiving a description of a texture from a user, generating two or more views of a texture map for the 3D object with a generative machine-learning (genML) model, wherein the plurality of depth maps and a text prompt based on the description are provided as input to the genML model and wherein each view of the two or more views of the texture map at least partially covers the 3D mesh of the 3D object, and combining the two or more views of the texture map based on the 3D mesh to obtain the texture map for the 3D object. Other embodiments of this aspect include corresponding computer systems, apparatus, and computer programs recorded on one or more computer storage devices, each configured to perform the actions of the methods.

In some implementations, the genML model includes a diffusion model comprising a plurality of sequential blocks and a control model coupled to the diffusion model, and the control model is configured to generate control inputs that are provided to one or more blocks of the plurality of sequential blocks of the diffusion model.

In some implementations, the genML model includes a locked version of the diffusion model where model parameters of the diffusion model are fixed, and wherein the locked version receives the control inputs via one or more zero convolution layers from an unlocked version of the diffusion model.

In some implementations, the computer-implemented method may further include providing a character sheet to the genML model, wherein the character sheet includes at least a first depth map that corresponds to a first view of the 3D object and a second depth map that corresponds to a second view of the 3D object, the first view and the second view being distinct, wherein generating the two or more views of the texture map for the 3D object includes generating, using the genML model, a first view of the texture map that corresponds to the first depth map and a second view of the texture map that corresponds to the second depth map.

In some implementations, generating the two or more views of the texture map for the 3D object may include generating, by the genML model, the first view of the texture map, and subsequent to generating the first view of the texture map, providing the first view of the texture map as a reference view to the genML model, and generating, by the genML model the second view of the texture map, wherein the first view of the texture map and the second view of the texture map are spatially consistent.

In some implementations, receiving the description from the user includes receiving user input that identifies a particular region of the 3D mesh, wherein the particular region excludes a part of the 3D mesh.

In some implementations, the computer-implemented method may further include determining that the two or more views of the texture map exclude at least one region of the 3D mesh of the 3D object, in response to determining that the two or more views of the texture map exclude the at least one region the 3D mesh of the object, generating at least one additional view of the texture map, wherein the at least one additional view are generated by one or more of: generating the additional view by providing an additional text prompt to the genML model, the additional text prompt identifying the at least one region, performing inpainting based on the two or more views of the texture map to obtain the at least one additional view, and combinations thereof.

In some implementations, generating the at least one additional view includes generating a plurality of side views based on a first view and a second view.

In some implementations, the computer-implemented method may further include displaying, on a display device, the 3D object, wherein the 3D object is displayed by layering the texture map onto the 3D mesh and is viewable by a user in 3D by rotating the displayed 3D object, receiving a second prompt from the user, in response to receiving the second prompt, providing the second prompt and the two or more views of the texture map to the genML model to generate a second set of two or more views associated with an updated texture map, and displaying, on the display device, an updated mesh that includes the second set of the two or more views.

In some implementations, the computer-implemented method may further include refining the texture map, wherein refining the texture map includes rendering the mesh that includes the texture map as an image, adding randomly sampled noise to the image to generate a noised image, performing a denoising step by applying the genML model to the noised image to determine a predicted noise, determining a score distillation sampling (SDS) loss based on the predicted noise and the randomly sampled noise, and determining, using the genML model, a refined texture map based on the SDS loss and the texture map.

In some implementations, the computer-implemented method may further include refining the texture map, wherein refining the texture map includes automatically providing the texture map and the text prompt based on the description as input to the genML model, obtaining a refined texture map for the 3D object, and displaying, on a display device, the 3D object, wherein the 3D object is displayed by layering the refined texture map onto the 3D mesh and is viewable by a user in 3D by rotating the displayed 3D object.

One general aspect includes a non-transitory computer-readable medium with instructions stored thereon, that responsive to execution by a processing device, cause the processing device to perform operations that include generating a plurality of depth maps based on a three-dimensional (3D) mesh of a three-dimensional (3D) object, wherein each of the plurality of depth maps is associated with a respective view of the 3D object, receiving a description of a texture from a user, generating two or more views of a texture map for the 3D object with a generative machine-learning (genML) model, wherein the plurality of depth maps and a text prompt based on the description are provided as input to the genML model and wherein each view of the two or more views of the texture map at least partially covers the 3D mesh of the 3D object, and combining the two or more views of the texture map based on the 3D mesh to obtain the texture map for the 3D object.

One general aspect includes a system that includes a memory with instructions stored thereon and a processing device, coupled to the memory, the processing device configured to access the memory and execute the instructions, where the instructions cause the processing device to perform operations that may include generating a plurality of depth maps based on a three-dimensional (3D) mesh of a three-dimensional (3D) object, wherein each of the plurality of depth maps is associated with a respective view of the 3D object, receiving a description of a texture from a user, generating two or more views of a texture map for the 3D object with a generative machine-learning (genML) model, wherein the plurality of depth maps and a text prompt based on the description are provided as input to the genML model and wherein each view of the two or more views of the texture map at least partially covers the 3D mesh of the 3D object, and combining the two or more views of the texture map based on the 3D mesh to obtain the texture map for the 3D object.

Implementations of the described techniques may include hardware, a method or process, or computer software on a computer-accessible medium.

DETAILED DESCRIPTION

Figure 1:
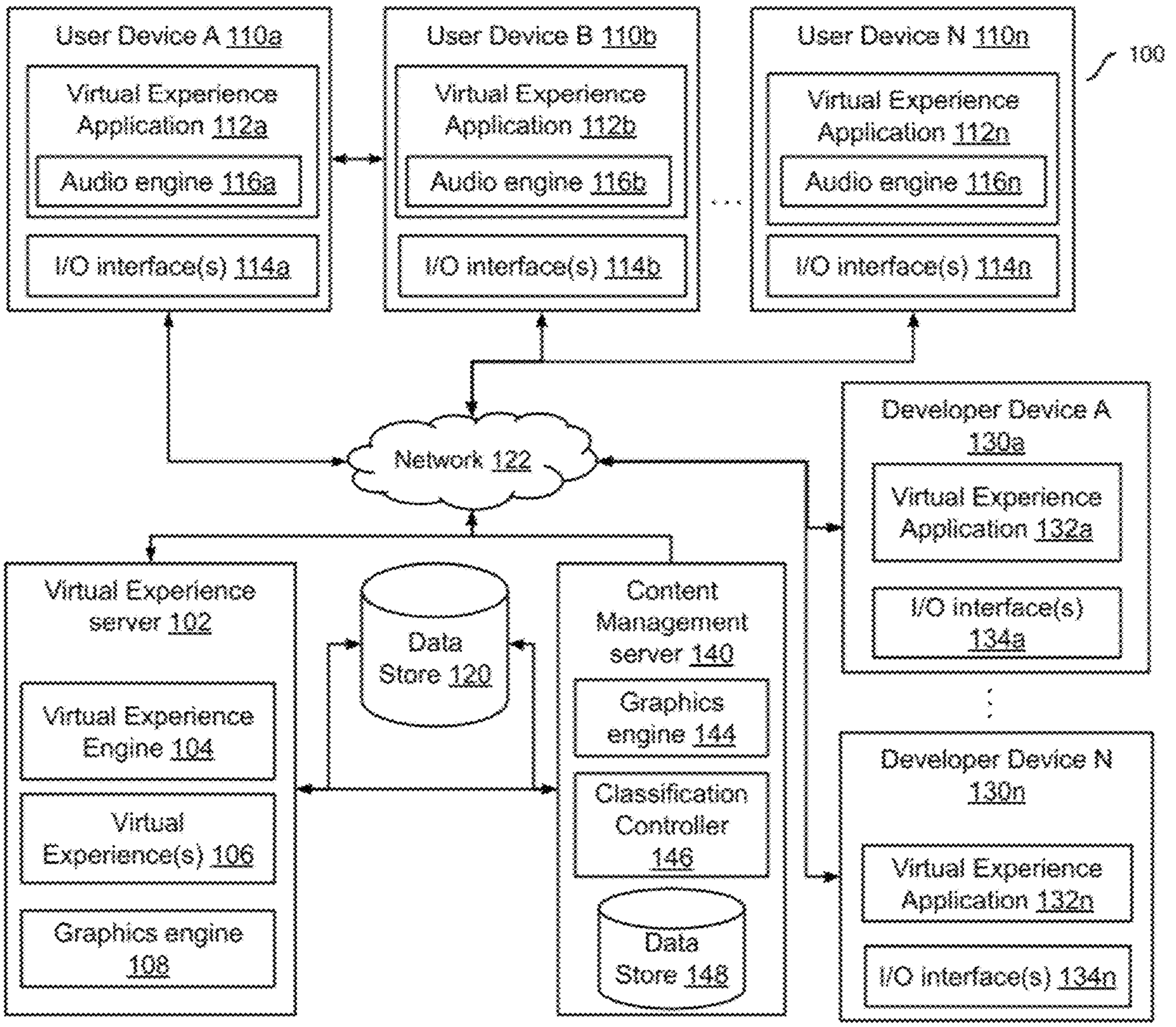
FIG. 1 is a diagram of an example environment to perform view-consistent texture generation for three-dimensional (3D) objects that are rendered on a computing device, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

Online virtual experience platforms (also referred to as "user-generated content platforms" or "user-generated content systems") offer a variety of ways for users to interact with one another. For example, users of an online virtual experience platform may work together towards a common goal, share various virtual experience items, send electronic messages to one another, and so forth. Users of an online virtual experience platform may join virtual experience(s), e.g., games or other experiences as virtual characters, playing specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

A virtual experience platform may enable users (developers) of the platform to create objects, new games, and/or characters. For example, users of the online gaming platform may be enabled to create, design, and/or customize new characters (avatars), new animation packages, new three-dimensional objects, etc. and make them available to other users.

Objects, e.g., virtual objects, may be traded, bartered, or bought and sold in online marketplaces for virtual and/or real currency. A virtual object may be offered within a virtual experience or virtual environment in any quantity, such that there may be a single instance ("unique object"), very few instances ("rare object"), a limited number of instances ("limited quantity"), or unlimited number of instances ("common object") of a particular object within the virtual experience or environment.

On some virtual platforms, developer users may upload three-dimensional (3D) object models, e.g., meshes and/or textures of 3D objects, for use in a virtual experience and for trade, barter, or sale on an online marketplace. The object models may be utilized and/or modified by other users. The object model can include 3D meshes that represent the geometry of the object and include vertices, and define edges, and faces. The object model may additionally include textures that define the object surface.

Textures associated with 3D objects are commonly utilized within virtual platforms. Textures are an important part of user self-expression and identity and are utilized by users to personalize their avatars. Textures offer visual differentiation of 3D objects, e.g., accessories, vehicles, etc., even when they are based on the same basic 3D mesh and are commonly utilized in virtual experiences on the virtual platform.

A persistent challenge in computer graphics and virtual experience (e.g., game) design, is the process of stylizing an untextured (rough) mesh. In many scenarios, content creators (developers) may start with a basic or coarse mesh, which they can customize, e.g., generate texture maps corresponding to the mesh and/or refine geometry details of the mesh to achieve an intended level of intricacy and/or uniqueness. Moreover, in certain scenarios, such as game development or in projects that require harmonization of visual styles (e.g., maintaining a thematic unity), creators also may have to ensure that the stylized mesh aligns seamlessly with the global style or visual environment. However, the texture generation process can be time-consuming and arduous, thereby impeding the ability of the developer to efficiently stylize the mesh.

In some applications, an artificial intelligence (AI) mediated approach may be utilized to optimize the creative workflow. For example, machine learning techniques, e.g., convolution neural networks (CNNs), generative adversarial networks (GANs), neural cellular automata (NCA), etc., may be utilized to speed up the process of texture generation. In some cases, a user may provide a description of an intended texture as input to an ML model, and the ML model may provide as output an image that represents the provided description.

However, a commonly encountered technical problem is view-inconsistency of the generated texture between different views of the 3D object. For example, a texture associated with a front of the 3D object may be different from a texture associated with the rear (back) of the 3D object. In some cases, the different views may be stylistically different, geometrically different, have different lighting, etc., thereby resulting in incongruent 3D objects and contributing to poor user experience.

An additional technical problem is refinement of a previously generated texture. In some cases, a generated texture may be acceptable, but for a portion of the texture where the user may want to alter the design. Given the nature of ML models, regenerating a texture may lead to the generation of a different style for the texture, rather than refining the previously generated texture.

An additional technical problem is that the user may be limited to providing an input description to an ML model in only one form, e.g., as textual description, sketch, etc.

An objective of a virtual experience platform owner or administrator is the provision of realistic on-screen depiction of textures for 3D objects. An additional objective of the virtual experience platform owner or administrator is to provide tools to content creators that can enable them to design and generate textures for 3D objects.

A technical problem for operators and/or administrators of virtual experience platforms is the provision of automatic, accurate, scalable, cost-effective, and reliable tools for creation (generation) and editing of textures for 3D objects. An additional technical problem is the generation of view-consistent generated textures between views.

Techniques described herein may be utilized to provide a scalable and adaptive technical solution to the creation (generation) of textures as well as for multi-modal editing (refinement) of generated textures. Various implementations described herein address the above-described drawbacks by providing techniques for the generation of view consistent textures.

In some implementations, the techniques may be utilized within a tool, e.g., a studio tool that may be utilized by developers to stylize mesh assets based on descriptions, e.g., textual prompts, voice prompts, sketches, etc. In some implementations, the tool may support creators to author (create) textures, e.g., for 3D objects where the 3D models (e.g., 3D meshes) have been created by the user, as well as for 3D models (3D meshes) provided via the virtual experience platform, 3D meshes obtained or purchased from other users, etc.

In some implementations, the techniques described herein may be utilized by a virtual platform to enable users to modify textures of a 3D object, e.g., an avatar, during their participation in a virtual experience, thereby enabling creators and players to customize virtual characters based on their preferences. This could enable in-experience creation wherein users (e.g., non-developer users) can utilize the techniques to stylize their avatars, accessories (e.g., clothing), or other mesh assets to be stylized and customized for their virtual experience.

The mesh stylization techniques described herein can enable users to generate new textures for 3D objects with relatively little effort. Users may refine geometry details for existing mesh assets using descriptions such as simple text prompts, thereby allowing content creators to achieve unique and stylized 3D scenes without requiring in-depth technical expertise on part of the users.

At different stages of texture generation, it may be beneficial for a user to be able to provide different forms of input to the ML model. For example, a text description at an initial stage, followed by a sketch on a generated texture that indicates edits to be made can provide flexibility of input and control over texture generation.

Techniques described herein enable the seamless and intuitive customization of 3D assets based on natural language descriptions. In some implementations, a generative machine learning (genML) technique may be utilized that includes use of conditional control of a machine learning model for generation of textures.

For example, a diffusion model may be utilized in conjunction with depth maps for generation of a front portion of a texture and a rear (back) portion of a texture. In some implementations, depth-based conditional control (e.g., via an augmented diffusion model) may be utilized to generate front and back textures for a given mesh asset. The conditional control may be utilized to leverage depth information rendered from the 3D mesh to ensure accurate and realistic texture synthesis.

Additionally, in some implementations, to ensure style consistency between the front and back generation of the texture, a character sheet may be utilized. During utilization of character sheets, rather than generating front and back views sequentially or as a batch process, both front and back views are generated as a single image based on guidance from a concatenated set of depth maps.

In some implementations, reference-guided genML may be utilized such that a primary view (e.g., a front view) is first generated, which is then utilized as a reference for other and subsequent views.

In some implementations, uncovered texture regions may be identified, and filled in by using an inpainting model. In some implementations, the inpainting model may be utilized to perform texture inpainting of portions of the generated texture that are uncovered. The 3D mesh is projected along with the covered (known) texels to two new views, e.g., a left view and a right view. An inpainting mask is calculated that marks the region (portions) to be filled in. The inpainting mask and depth guidance are provided to a genML model, as input to generate the textures for the uncovered texture regions. In some implementations, a normal constraint may be utilized during an inverse projection process.

In some implementations, iterative refinement of the texture may be performed based on modified descriptors, e.g., text prompts, received from a user. For example, in scenarios where the initial generation of the 3D texture may not meet a user's expectation, iterative refinement may be utilized to provide additional mesh texture and mesh geometry customization via an interactive approach. During this iterative process, users can modify utilized text prompts and/or introduce additional descriptions. This may enable the users to steer the creative direction and achieve a more satisfying and stylized result.

In some implementations, an initial texture generation process may be based on textual descriptions provided by the user, and the texture generation system generates textures based solely on the text prompts. However, during iterative refinement of the texture, the previously generated texture (content) is utilized as a starting point, which provides a foundation that users can build upon to realize their intended changes. Crucially, the techniques can enable users to specify an extent to which they want the original texture to be unchanged.

Additionally, the overall texture and/or 3D mesh may be refined by using score distillation sampling (SDS). In some implementations, mesh refinement of the texture as well as geometry may be performed. During mesh refinement, additional details may be added to the geometry and/or texture, along with providing edits to any artifacts introduced in the previous steps. The refinement process may be performed as a series of iterations. At each iteration of the refinement process, the system projects the mesh onto various randomly chosen viewpoints.

Subsequently, genML (e.g., diffusion) models are employed to perform denoising on the renderings of the 3D mesh. The denoising step offers valuable signals that can be utilized to guide the renderings to be more detailed, realistic, and visually consistent with the input prompts provided by the user. The signals may be utilized to update both the mesh's geometry and texture. By applying the score distillation sampling technique across a series of iterations, the mesh texture and/or geometry may be progressively refined and optimized, thereby aligning it with user preferences and intent.

In some implementations, support may be provided for multiple types of input modalities from a user. For example, there may be scenarios where text descriptions may be inadequate and insufficient to accurately convey a precise intent of mesh stylization, particularly in terms of overall style and geometric modifications. In such scenarios, utilization of other modalities, e.g., images, sketches, etc., may be beneficial. Accordingly, users may be provided with an option to input an image or sketch into the processing pipeline described herein. Utilization of the provided input may be utilized to generate an updated mesh that embodies the overarching style of the input image, while taking the additional user provided input into account. Additionally, hand-drawn sketches (sketch-guidance) may be utilized to pinpoint specific geometric alterations, thereby addressing challenges that text prompts might not be able to detail with precision.

Techniques for mesh stylization described herein introduce a new approach to 3D asset customization that can enable users to stylize textures and geometry details through natural language descriptions. The automated processes contribute to more efficient and accessible 3D mesh customization, promoting creativity and enabling a wider range of users to create compelling 3D scenes with ease.

In some implementations, the techniques may include providing tools that enable users to input images in lieu of or in addition to their text prompt to influence an artistic style and color palette of their resulting texture(s). While the text prompt and the mesh being textured govern the content of the resulting texture, style control may provide users (creators) the ability to influence the style of the texture, thereby giving creators more creative control and the ability to create assets that better fit within their existing experiences and creative vision.

FIG. 1 is a diagram of an example environment to perform view-consistent texture generation for three-dimensional (3D) objects that are rendered on a computing device, in accordance with some implementations. FIG. 1 and other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes online virtual experience server 102, data store 120, user devices 110*a*, 110*b*, and 110*n* (generally referred to as "user device(s) 110" herein), and developer devices 130*a* and 130*n* (generally referred to as "developer device(s) 130" herein), virtual experience server 102, content management server 140, data store 120, user devices 110, and developer devices 130 are coupled via network 122. In some implementations, user devices(s) 110 and developer device(s) 130 may refer to the same or same type of device.

Online virtual experience server 102 can include a virtual experience engine 104, one or more virtual experience(s) 106, and graphics engine 108. A user device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc. The input/output devices can also include accessory devices that are connected to the user device by means of a cable (wired) or that are wirelessly connected.

Content management server 140 can include a graphics engine 144, and a classification controller 146. In some implementations, the content management server may include a plurality of servers. In some implementations, the plurality of servers may be arranged in a hierarchy, e.g., based on respective prioritization values assigned to content sources.

Graphics engine 144 may be utilized for the rendering of one or more objects, e.g., 3D objects associated with the virtual environment. Classification controller 146 may be utilized to classify assets such as 3D objects and for the detection of inauthentic digital assets, etc. Data store 148 may be utilized to store a search index, model information, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, a cloud storage system, or another type of component or device capable of storing data. The data store 120 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, a distributed computing system, a cloud computing system, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on user devices 110.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be an online gaming server. For example, the virtual experience server may provide single-player or multiplayer games to a community of users that may access or interact with games using user devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using user devices (e.g., 110) within a game (e.g., game that is part of virtual experience 106) or the presentation of the interaction on a display or other output device (e.g., 114) of a user device 110.

In some implementations, a virtual experience 106 can include an electronic file that can be executed or loaded using software, firmware or hardware configured to present the game content (e.g., digital media item) to an entity. In some implementations, a virtual experience application 112 may be executed and a virtual experience 106 executed in connection with a virtual experience engine 104. In some implementations, a virtual experience (e.g., a game) 106 may have a common set of rules or common goal, and the environment of a virtual experience 106 shares the common set of rules or common goal. In some implementations, different games may have different rules or goals from one another.

In some implementations, virtual experience(s) may have one or more environments (also referred to as "gaming environments" or "virtual environments" herein) where multiple environments may be linked. An example of an environment may be a three-dimensional (3D) environment. The one or more environments of a virtual experience application 106 may be collectively referred to a "world" or "gaming world" or "virtual world" or "universe" herein. An example of a world may be a 3D world of a virtual experience 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience server 102 can host one or more virtual experiences 106 and can permit users to interact with the virtual experiences 106 using a virtual experience application 112 of user devices 110. Users of the online virtual experience server 102 may play, create, interact with, or build virtual experiences 106, communicate with other users, and/or create and build objects (e.g., also referred to as "item(s)" or "game objects" or "virtual game item(s)" herein) of virtual experiences 106. For example, in generating user-generated virtual items, users may create characters, decoration for the characters, one or more virtual environments for an interactive game, or build structures used in a game. In some implementations, users may buy, sell, or trade virtual game objects, such as in-platform currency (e.g., virtual currency), with other users of the online virtual experience server 102. In some implementations, online virtual experience server 102 may transmit game content to virtual experience applications (e.g., 112). In some implementations, game content (also referred to as "content" herein) may refer to any data or software instructions (e.g., game objects, game, user information, video, images, commands, media item, etc.) associated with online virtual experience server 102 or virtual experience applications. In some implementations, game objects (e.g., also referred to as "item(s)" or "objects" or "virtual objects" or "virtual game item(s)" herein) may refer to objects that are used, created, shared or otherwise depicted in virtual experiences 106 of the online virtual experience server 102 or virtual experience applications 112 of the user devices 110. For example, game objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration, rather than limitation. In some implementations, online virtual experience server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual application 106 may be associated with a particular user or a particular group of users (e.g., a private game), or made widely available to users with access to the online virtual experience server 102 (e.g., a public game). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or user devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the game (e.g., rendering commands, collision commands, physics commands, etc.) In some implementations, virtual experience applications 112 of user devices 110, may work independently, in collaboration with virtual experience engine 104 of online virtual experience server 102, or a combination of both.

In some implementations, both the online virtual experience server 102 and user devices 110 may execute a virtual experience engine and a virtual experience application (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of user device 110. In some implementations, each virtual application 106 may have a different ratio between the virtual experience engine functions that are performed on the online virtual experience server 102 and the virtual experience engine functions that are performed on the user devices 110. For example, the virtual experience engine 104 of the online virtual experience server 102 may be used to generate physics commands in cases where there is a collision between at least two virtual application objects, while the additional virtual experience engine functionality (e.g., generate rendering commands) may be offloaded to the user device 110. In some implementations, the ratio of virtual experience engine functions performed on the online virtual experience server 102 and user device 110 may be changed (e.g., dynamically) based on gameplay conditions. For example, if the number of users participating in gameplay of a particular virtual application 106 exceeds a threshold number, the online virtual experience server 102 may perform one or more virtual experience engine functions that were previously performed by the user devices 110.

For example, users may be participating in a virtual experience 106 on user devices 110, and may send control instructions (e.g., user inputs, such as right, left, up, down, user election, or character position and velocity information, etc.) to the online virtual experience server 102. Subsequent to receiving control instructions from the user devices 110, the online virtual experience server 102 may send gameplay instructions (e.g., position and velocity information of the characters participating in the group gameplay or commands, such as rendering commands, collision commands, etc.) to the user devices 110 based on control instructions. For instance, the online virtual experience server 102 may perform one or more logical operations (e.g., using virtual experience engine 104) on the control instructions to generate gameplay instruction(s) for the user devices 110. In other instances, online virtual experience server 102 may pass one or more or the control instructions from one user device 110 to other user devices (e.g., from user device 110*a* to user device 110*b*) participating in the virtual experience 106. The user devices 110 may use the gameplay instructions and render the gameplay for presentation on the displays of user devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a user device 110 to another user device (e.g., from user device 110*b* to user device 110*n*), where the other user device generates gameplay instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a user device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online virtual experience server 102 may store characters created by users in the data store 120. In some implementations, the online virtual experience server 102 maintains a character catalog and game catalog that may be presented to users. In some implementations, the game catalog includes images of virtual experiences stored on the online virtual experience server 102. In addition, a user may select a character (e.g., a character created by the user or other user) from the character catalog to participate in the chosen game. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the virtual experience platform may support three-dimensional (3D) objects that are represented by a 3D model and includes a surface representation used to draw the character or object (also known as a skin or mesh) and a hierarchical set of interconnected bones (also known as a skeleton or rig). The rig may be utilized to animate the object and to simulate motion of the object. The 3D model may be represented as a data structure, and one or more parameters of the data structure may be modified to change various properties of the character, e.g., dimensions (height, width, girth, etc.); shape; movement style; number/type of parts; proportion, etc.

In some implementations, the 3D model may include a 3D mesh. The 3D mesh may define a three-dimensional structure of the unauthenticated virtual 3D object. In some implementations, the 3D mesh may also define one or more surfaces of the 3D object. In some implementations, the 3D object may be a virtual avatar, e.g., a virtual character such as a humanoid character, an animal-character, a robot-character, etc.

In some implementations, the mesh may be received (imported) in a FBX file format. The mesh file includes data that provides dimensional data about polygons that comprise the virtual 3D object and UV map data that describes how to attach portions of texture to various polygons that comprise the 3D object. In some implementations, the 3D object may correspond to an accessory, e.g., a hat, a weapon, a piece of clothing, etc. worn by a virtual avatar or otherwise depicted with reference to a virtual avatar.

In some implementations, a platform may enable users to submit (upload) candidate 3D objects for utilization on the platform. A virtual experience development environment (developer tool) may be provided by the platform, in accordance with some implementations. The virtual experience development environment may provide a user interface that enables a developer user to design and/or create virtual experiences, e.g., games. The virtual experience development environment may be a client-based tool (e.g., downloaded and installed on a client device, and operated from the client device), a server-based tool (e.g., installed and executed at a server that is remote from the client device, and accessed and operated by the client device), or a combination of both client-based and service-based elements.

The virtual experience development environment may be operated by a developer of a virtual experience, e.g., a game developer or any other person who seeks to create a virtual experience that may be published by an online virtual experience platform and utilized by others. The user interface of the virtual experience development environment may be rendered on a display screen of a client device, e.g., such as a developer device 130 described with reference to FIG. 1, so as to enable the creator/developer to interact with the development environment using actions such as typing, highlighting, selecting, drag and drop, clicking, and so forth via a mouse, keyboard, or other input device configured to communicate with the user interface. The user interface may include a menu bar, a tool bar, a workspace pane, and a plurality of secondary panes. Depending on the particular implementation, the user interface may include alternative or additional elements, arrangements, operational features, etc. of the virtual experience development environment than what is shown and described herein.

A developer user (creator) may utilize the virtual experience development environment to create virtual experiences. As part of the development process, the developer/creator may upload various types of digital content such as object files (meshes), image files, audio files, short videos, etc., to enhance the virtual experience.

In implementations where the 3D object is an accessory, data indicative of use of the object in a virtual experience may also be received. For example, a "shoe" object may include annotations indicating that the object can be depicted as being worn on the feet of a virtual humanoid character, while a "shirt" object may include annotations that it may be depicted as being worn on the torso of a virtual humanoid character.

In some implementations, the 3D model may further include texture information associated with the 3D object. For example, texture information may indicate color and/or pattern of an outer surface of the 3D object. The texture information may enable varying degrees of transparency, reflectiveness, degrees of diffusiveness, material properties, and refractory behavior of the textures and meshes associated with the 3D object. Examples of textures include plastic, cloth, grass, a pane of light blue glass, ice, water, concrete, brick, carpet, wood, etc.

In some implementations, the user device(s) 110 may each include computing devices such as personal computers (PCs), mobile devices (e.g., laptops, mobile phones, smart phones, tablet computers, or netbook computers), network-connected televisions, gaming consoles, etc. In some implementations, a user device 110 may also be referred to as a "client device." In some implementations, one or more user devices 110 may connect to the online virtual experience server 102 at any given moment. It may be noted that the number of user devices 110 is provided as illustration. In some implementations, any number of user devices 110 may be used.

In some implementations, each user device 110 may include an instance of the virtual experience application 112, respectively. In one implementation, the virtual experience application 112 may permit users to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to user device 110 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

In some implementations, the virtual experience application may include an audio engine 116 that is installed on the user device, and which enables the playback of sounds on the user device. In some implementations, audio engine 116 may act cooperatively with audio engine 144 that is installed on the sound server.

According to aspects of the disclosure, the virtual experience application may be an online virtual experience server application for users to build, create, edit, upload content to the online virtual experience server 102 as well as interact with online virtual experience server 102 (e.g., participate in virtual experiences 106 hosted by online virtual experience server 102). As such, the virtual experience application may be provided to the user device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a virtual experience program) that is installed and executes local to user device 130 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or play virtual experiences 106 hosted by online virtual experience server 102). As such, the virtual experience application may be provided to the user device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual applications 106 developed, hosted, or provided by a virtual experience application developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience application developer may obtain access to virtual experience application objects, such as in-platform currency (e.g., virtual currency), avatars, special powers, accessories, that are owned by or associated with other users.

In general, functions described in one implementation as being performed by the online virtual experience server 102 can also be performed by the user device(s) 110, or a server, in other implementations if appropriate. In addition, the functionality attributed to a particular component can be performed by different or multiple components operating together. The online virtual experience server 102 can also be accessed as a service provided to other systems or devices through appropriate application programming interfaces (APIs), and thus is not limited to use in websites.

In some implementations, online virtual experience server 102 may include a graphics engine 108. In some implementations, the graphics engine 108 may be a system, application, or module that permits the online virtual experience server 102 to provide graphics and animation capability. In some implementations, the graphics engine 108, and/or content management server 140 may perform one or more of the operations described below in connection with the flowcharts and workflows shown in FIGS. 3A-3B, 4A, 5, 7, and 8.

Figure 2A:
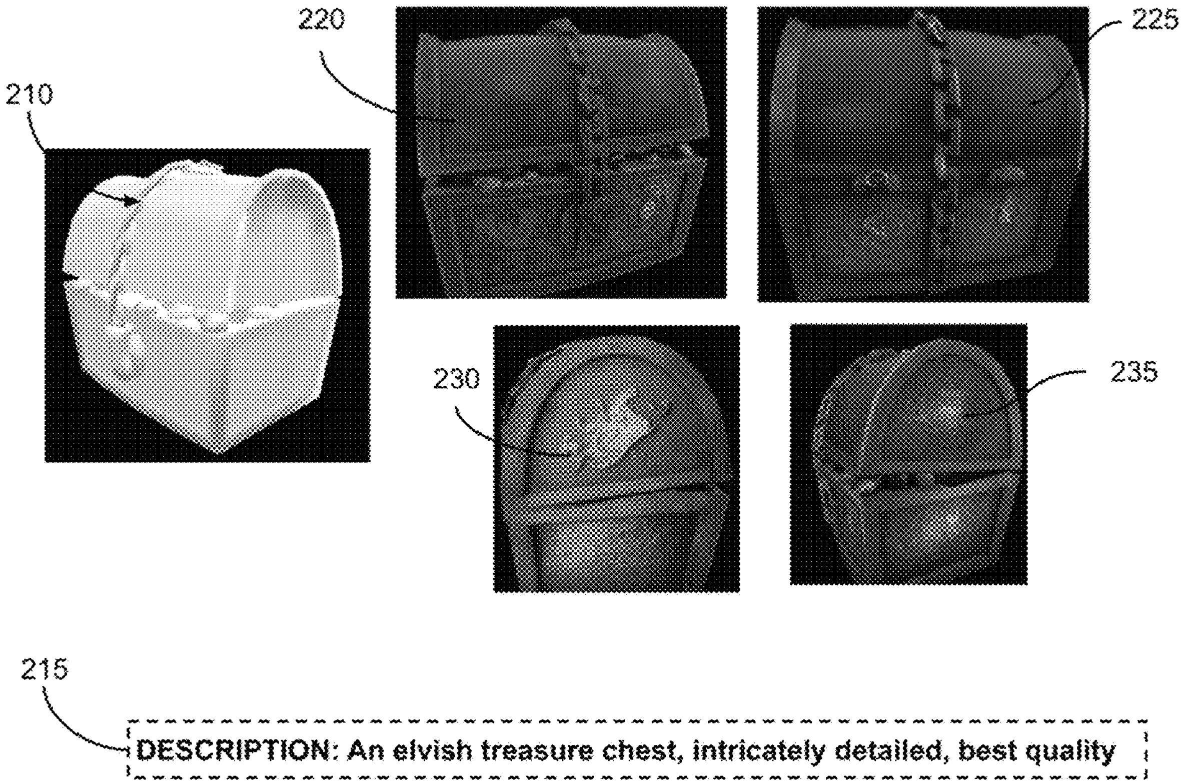
FIG. 2A depicts an example of an untextured mesh and views of a textured mesh generated based on a user provided description, in accordance with some implementations.

FIG. 2A depicts an example of an untextured mesh and views of a textured mesh generated based on a user provided description, in accordance with some implementations.

FIG. 2A depicts an untextured mesh 210, a description 215 of a texture, and views 220, 225, 230, and 235 of a three-dimensional (3D) object.

In this illustrative example, description 215 is a textual description "An elvish treasure chest, intricately detailed, best quality" that is provided by a user as user input for the generation of a texture for untextured mesh 210.

In some implementations, the generated texture may be in the form of a texture map (UV map). The texture map (UV map) is a two-dimensional representation of the surface of an associated 3D object. The texture map is constructed from UV or texture coordinates that correspond to the vertices of the 3D object model (mesh). Each texture coordinate in the texture map has a corresponding point on the surface of the 3D object. The coordinates serve as the marker points to define a correspondence between pixels on the texture map and vertices of the 3D object model.

FIG. 2A depicts example views of the textured 3D object based on a texture map that is generated by applying the description 215 to a generative machine-learning (genML) model, e.g., an augmented diffusion model. In this illustrative example, a front view 220, a back view 225, a first side view 230, and a second side view 235 are depicted.

Figure 2B:
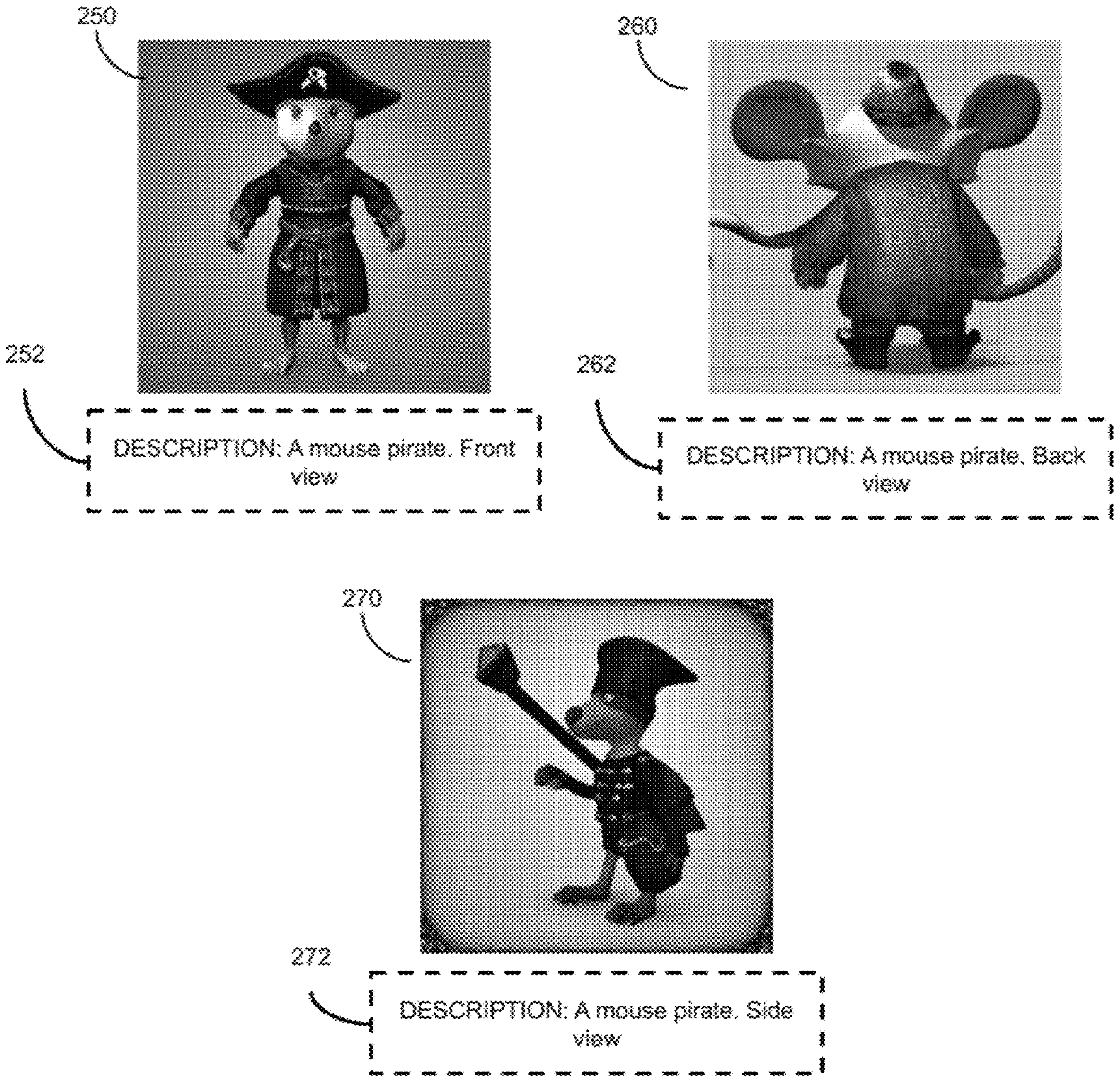
FIG. 2B depicts examples of generated textures for a 3D object, with inconsistent views, in accordance with some implementations.

FIG. 2B depicts examples of inconsistently generated textures for a 3D object, in accordance with some implementations.

In this illustrative example, FIG. 2B depicts example user-provided descriptions and corresponding views of an example avatar ("mouse pirate") with textures generated by a genML model. The example descriptions include a first description 252 ("A mouse pirate. Front view"), a second description 262 ("A mouse pirate. Back view"), and a third description 272 ("DESCRIPTION: A mouse pirate. Side view"). A corresponding first view 250, a second view 260, and a third view 270 are depicted in FIG. 2B. As can be seen, there are consistencies in the geometry as well as texture between the views.

For example, the hat worn by the avatar in each of the views is different. The first view 250 and the third view 270 depict the avatar without shoes, whereas the avatar in second view 250 is depicted wearing shoes. The second view 260 depicts the avatar as having a tail, whereas the avatar in the third view 270 is shown without a tail. The avatar in the third view 270 is shown sporting a long accessory that is absent in the avatar in the first view 250 and the second view 260. The accessories such as upper and lower garments worn by the avatar are also inconsistent across the views.

Various inconsistencies can include inconsistencies in any of multiple attributes of a 3D object, e.g., shape, size, texture, etc. Additionally, inconsistencies across views can exist in attributes such as style, lighting, color, etc.

Figure 3A:
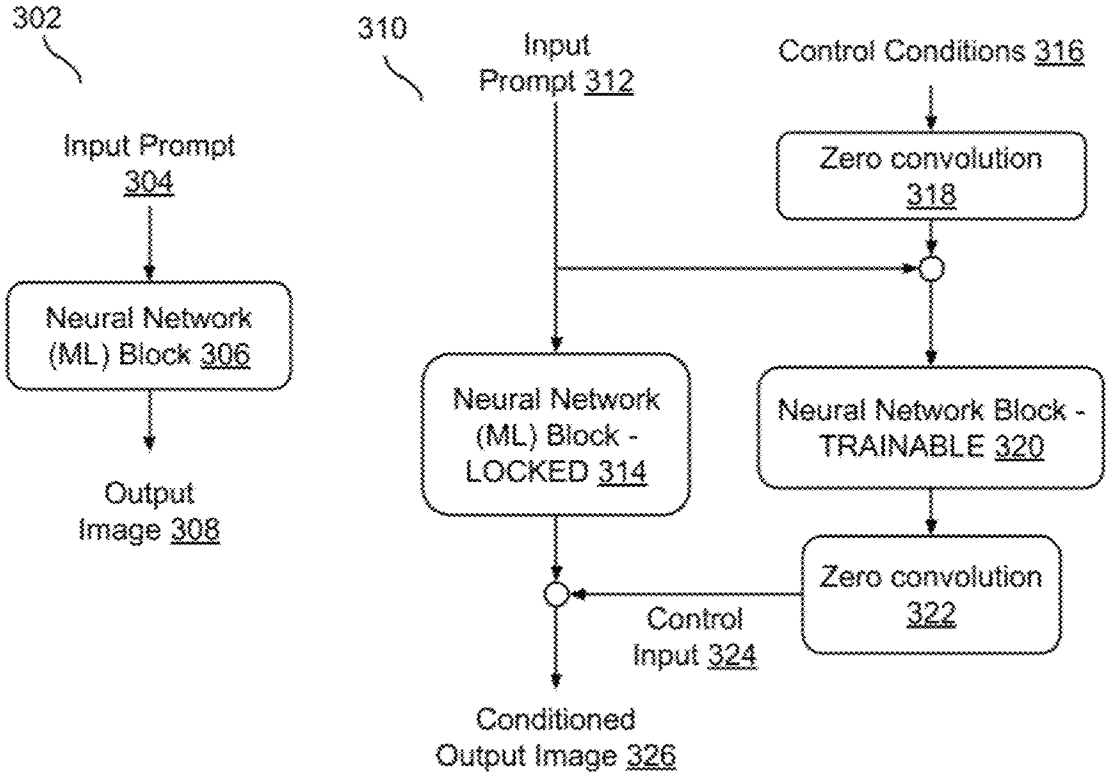
FIG. 3A depicts an example of conditional control of a neural network, in accordance with some implementations.

FIG. 3A depicts an example of conditional control of a neural network, in accordance with some implementations. In this illustrative example, a baseline neural network 302 and an augmented neural network 310 are depicted. Baseline neural network 302 includes a neural network (ML) block 306 that takes an input prompt 304 as input and provides an output image 306 as output.

The augmented neural network 310 includes a locked version of the neural network (ML) block 314 and takes input prompt 312 as input and provides a conditioned output image 326 as output. The augmented neural network 310 further includes a trainable (unlocked) neural network block 320 that provides one or more control inputs 324 via zero convolution 322.

Control conditions 316 are provided (e.g., by a user) to the trainable (unlocked) neural network block 320 via zero convolution 318. Control conditions 316 are utilized to generate and provide control inputs 324. The output of the locked version of the neural network (ML) 314 is utilized in conjunction with the control inputs 324 to provide as output conditioned output image 326.

In some implementations, the network blocks may be sets of neural layers that are commonly put together to form a single unit of a neural network, e.g., ResNet blocks, Conv-BN-ReLu blocks (Conv. stands for convolution, BN for batch normalization, and ReLU for rectified linear unit), multi-head attention blocks, transformer blocks, etc.

In some implementations, the neural network 306, the neural network (ML) Block-Locked 314, and the neural network (ML) Block-TRAINABLE 320 may be diffusion models.

Figure 3B:
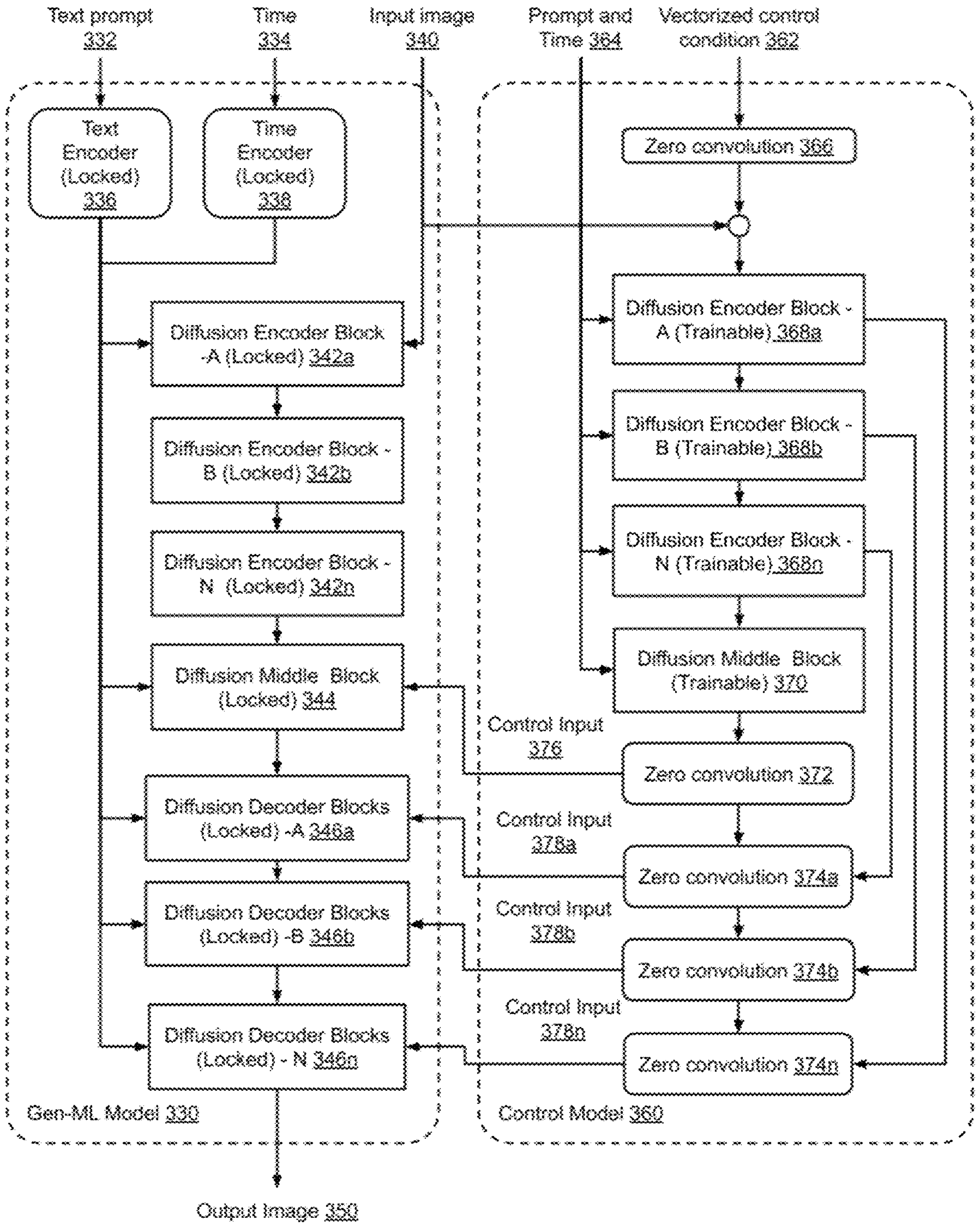
FIG. 3B depicts an example of an augmented diffusion model that can be utilized to perform view-consistent texture generation for 3D objects, in accordance with some implementations.

FIG. 3B depicts an example of an augmented diffusion model that can be utilized to perform view-consistent texture generation for 3D objects, in accordance with some implementations. FIG. 3B provides a more detailed view of the augmented neural network described with reference to FIG. 3A.

The augmented diffusion model includes a genML model 330 and a control model 360. A text prompt 332, an input image 340, and timestep 334 are provided as inputs to the genML model 330 which generates output image 350 as output. As described with reference to FIG. 3A, the genML model is a locked model where model parameters are frozen, subsequent to training of the genML model. In some implementations, the control model 360 is a cloned, but trainable version of the genML model.

A text encoder (Locked) 336 is utilized to process text prompt 332 and a time encoder (Locked) 338 is utilized to process timestep 334. A vectorized control condition 362 along with prompt and timestep 364 are provided as input to control model 360.

In some implementations, the genML model 330 is a diffusion model that includes multiple diffusion encoder blocks (Locked) 342, a diffusion middle block (Locked) 344, and multiple skip-connected diffusion decoder blocks (Locked) 346.

In some implementations, the control model 360 includes multiple diffusion encoder blocks (Trainable) 368, and a diffusion middle block (Trainable) 370.

The control model 360 further includes a zero convolution layer 366 on the input side, a zero convolution layer 372 associated with the diffusion middle block (Locked) 344, and multiple zero convolution layer blocks 374.

The zero convolution layer 372 provides control inputs 376 to diffusion middle block (Locked) 344, while zero convolution layers 374 provide control inputs 378 to diffusion decoder blocks (Locked) 346. Utilization of zero convolution layers enables efficient training by limiting the amount of added noise to the features. In some implementations, this may enable faster training of the augmented diffusion model.

The control model 360 (trainable copy of genML model 330) takes vectorized control condition 362 as input and generates control inputs 376 and 378 that are provided to the genML model. When this structure is applied to large genML models. e.g., a stable diffusion model, the locked parameters preserve the production-ready model trained with billions of images, while the large scale pretrained model is reused by the trainable copy to handle diverse input conditions and provide conditional control to the genML model.

Any number of encoder blocks, middle blocks, and/or decoder blocks can be utilized to implement the augmented diffusion model, depending on the particular implementation, computational resource availability, and/or performance requirements.

Figure 4A:
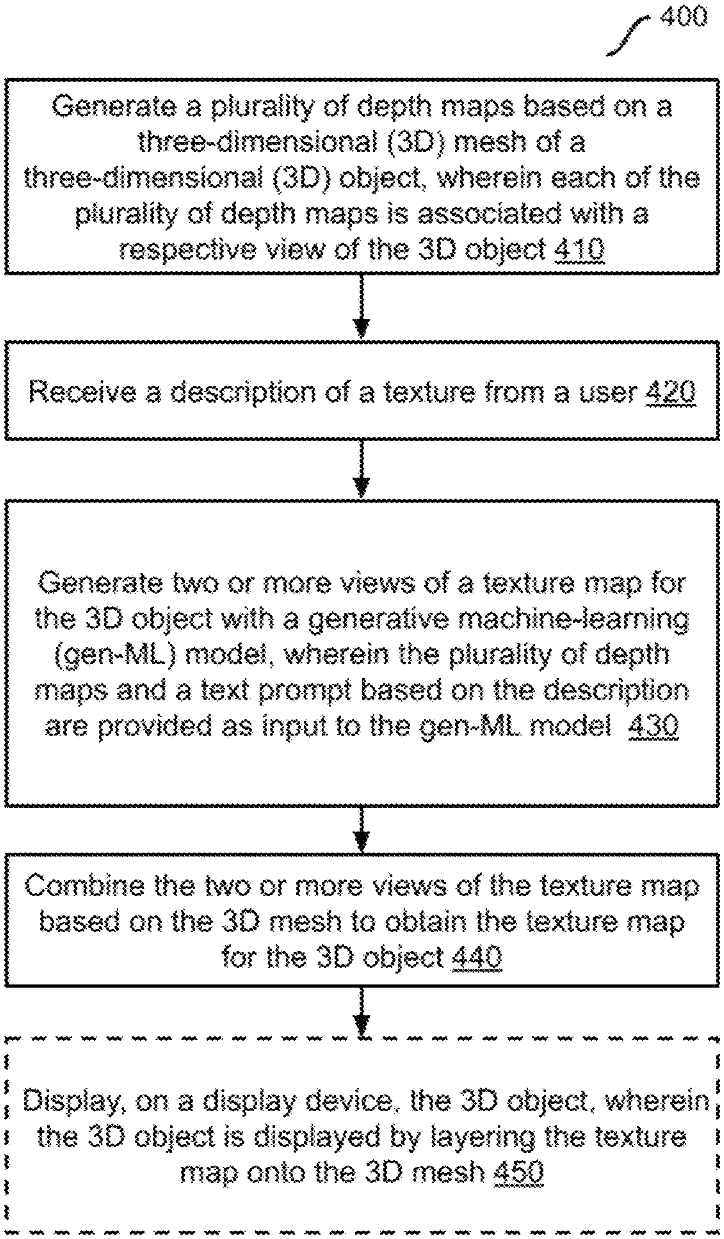
FIG. 4A illustrates an example method to generate a view-consistent texture map for a 3D mesh, in accordance with some implementations.

FIG. 4A illustrates an example method to generate a view-consistent texture map for a 3D mesh, in accordance with some implementations. In some implementations, method 400 can be implemented, for example, on virtual experience 102 described with reference to FIG. 1. In some implementations, some or all portions of the method 400 can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., a request received from a user to generate and/or modify a texture, receiving a description of a texture and/or mesh geometry from a user via a user device (client device), a predetermined time period having expired since the last performance of method 400, and/or one or more other conditions occurring which can be specified in settings read by the method. Method 400 may begin at block 410.

At block 410, a plurality of depth maps based on a three-dimensional (3D) mesh of a three-dimensional (3D) object are generated. The 3D mesh is a representation (e.g., a mathematical model) of the geometry of the 3D object. In some implementations, each of the depth maps is an image or image channel that includes distance information of respective points on the surface of the 3D object from a particular viewpoint, e.g., a particular camera view of a camera positioned relative to the 3D object. In some implementations, the 3D object may be an imaginary character or avatar. In some other implementations, the 3D object may be an inanimate object, an accessory such as clothing, weapon, etc.

In some implementations, the depth map may be generated by rasterizing a mesh of the 3D object onto a two-dimensional (2D) plane. A luminance (brightness) of each point in the depth map may be indicative of its distance from the camera. For example, in some implementations, nearer surfaces are depicted as being darker and farther surfaces are depicted as being lighter.

In some implementations, each of the plurality of depth maps is associated with a respective view of the 3D object. For example, the depth maps may be associated with a front view, a back view, and one or more side views. Block 410 may be followed by block 420.

At block 420, a description of a texture may be received from a user. The description may be received in a variety of modes and/or formats, e.g., as textual description received via a keyboard of a user device, as textual description received via voice input received from a user device, as a sketch drawn by the user directly on a user device, an image of a sketch drawn by a user and uploaded as an image, etc.

In some implementations, a specialized user interface may be provided that supports the multiple modes of interaction. For example, the user interface may support global text prompts, local text prompts, reference imagery for stylization, etc.

In some implementations, receiving the description from the user may include receiving user input that identifies a particular region of the mesh of a 3D object, wherein the particular region excludes a part of the mesh of the 3D object. Block 420 may be followed by block 430.

At block 430, two or more views of a texture map for the 3D object are generated by utilizing a generative machine-learning (genML) model, wherein the plurality of depth maps and a text prompt based on the received description are provided as input to the genML model. In some implementations, each view of the two or more views of the texture map at least partially covers the 3D mesh of the 3D object.

In some implementations, the genML model includes a diffusion model that includes a plurality of sequential blocks and a control model coupled to the diffusion model, and wherein the control model is configured to generate control inputs that are provided to one or more blocks of the plurality of sequential blocks of the diffusion model.

In some implementations, the genML model is an augmented diffusion model that includes a locked (frozen) version of the diffusion model wherein model parameters of the diffusion model are fixed, and wherein the locked version receives control inputs via one or more zero convolution layers from an unlocked (trainable) version of the diffusion model.

In some implementations, the genML model includes a locked version of the diffusion model and an unlocked version of the diffusion model that previously trained based on training datasets. For example, in some implementations, the locked version of the diffusion model may be trained based on publicly available images and associated captions/descriptions (e.g., textual descriptions). In some implementations, the locked version of the diffusion model may be a pretrained model that is trained on millions of images and available as an open-source model.

In some implementations, the unlocked (trainable) version of the diffusion model may be trained based on a training dataset that additionally includes control conditions associated with the image.

In some implementations, the control model provides control inputs that are generated based on the text prompt, an input noise image, and a timestep (of the diffusion model). In some implementations, in addition to or instead of depth maps, images of the 3D object, edges (e.g., canny edges) and/or pose (e.g., if the 3D mesh is associated with a humanoid or animal, with known joints) can be provided as inputs to the control model.

In some implementations, the text prompt provided to the genML model may be automatically generated based on the description of the texture received from the user. In some implementations, a preprocessing tool may be applied to the user provided description to generate a text prompt that has greater effectiveness when applied to the genML model.

In some implementations, the textual description received from the user may be directly provided to the genML model without any additional processing.

In some implementations, a character sheet is provided to the genML model to guide the generation of the texture based on the description and/or text prompt. In some implementations, the character sheet includes at least a first depth map that corresponds to a first view of the 3D object and a second depth map that corresponds to a second view of the 3D object. In some implementations, the first view and the second view are distinct views.

Figure 4B:
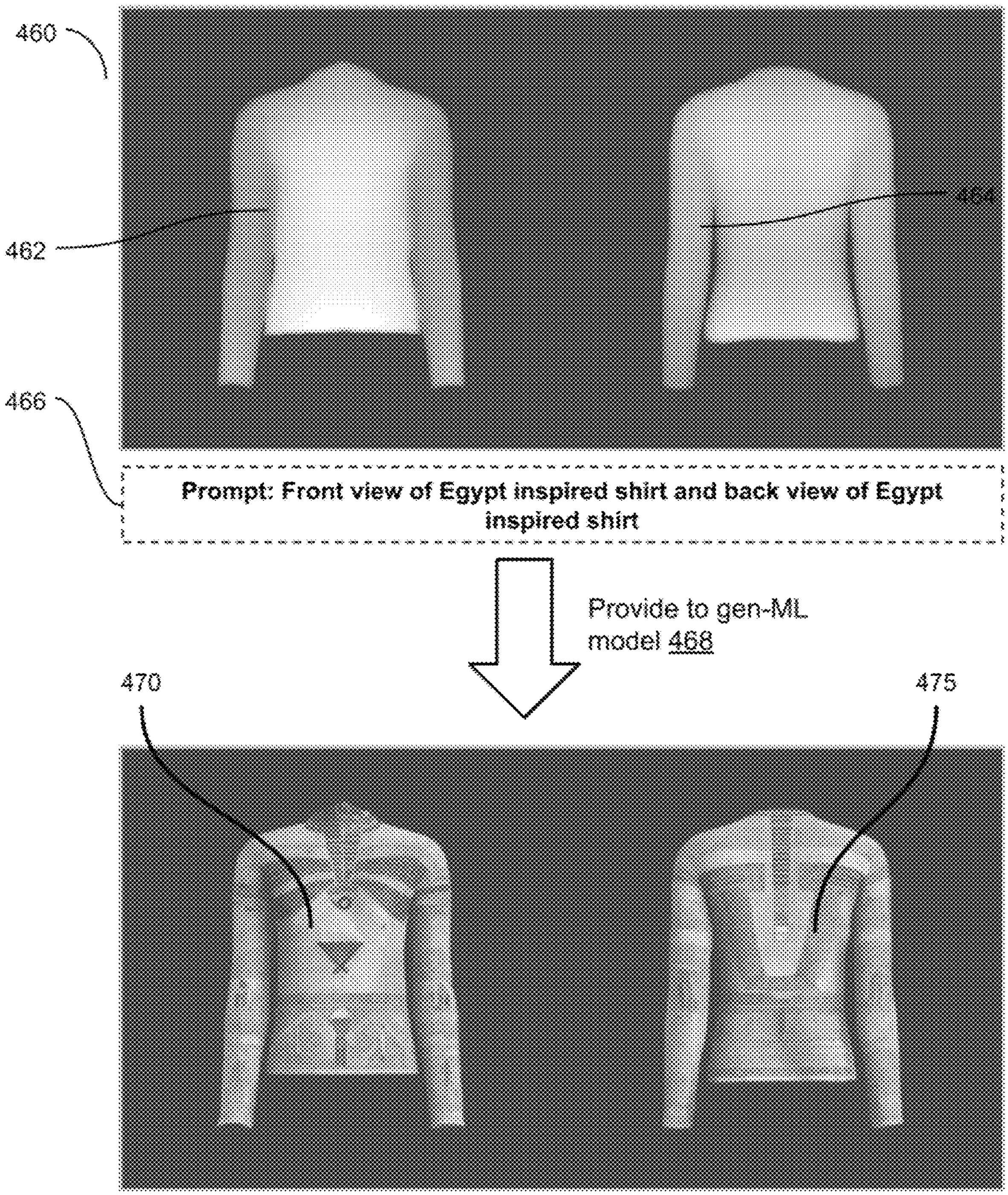
FIG. 4B illustrates example utilization of a character sheet to generate a view-consistent texture map for a 3D mesh, in accordance with some implementations.

FIG. 4B illustrates example utilization of a character sheet to generate a view-consistent texture map for a 3D mesh, in accordance with some implementations.

FIG. 4B depicts an example character sheet 460 that includes a first depth map 462 and a second depth map 464 generated based on a 3D mesh of a shirt accessory (3D object). The character sheet 460 is provided along with text prompt 466 to a genML model to generate views of a texture; a first view 470 and a second view 475.

The character sheet 460 is utilized by the genML model to ensure view consistency across multiple views. In some implementations, instead of generating multiple views sequentially or as a set of views generated as a batch, the different views are generated by the genML model as a single image using guidance from a concatenated set of depth maps. This enables greater view consistency across the multiple views of generated textures.

In some implementations, generating the two or more views of the texture map for the 3D object may include generating, using the genML model, a single image that includes the two or more views of the texture map for the 3D object.

In some other implementations, generating the two or more views may include generating, using the genML model, a first view of the texture map that corresponds to the first depth map and a second view of the texture map that corresponds to the second depth map.

In some implementations, providing the text prompt to the genML model may include providing a regionally defined text prompt that is determined based on the description. Providing the regionally defined text prompt can include providing view centric words for cross-attention that may lead to superior results and greater view consistency in textures generated by the genML model.

In some implementations, providing the text prompt to the genML model can include providing specific input that indicates a region associated with a respective portion of the view. For example, an example text prompt received from a user may be "Shirt with Superman inspired left sleeve and Spiderman like right sleeve." In some implementations, the regional definitions may be provided by a user by other modalities, e.g., via audio, or other input (e.g., a gesture, region selection by drawing a "left arm" by encircling the corresponding region (e.g., arm of avatar on a displayed image) on a user device or other indication that indicates the region of interest.

In some implementations, generating the two or more views of the texture map for the 3D object may include generating a reference view. For example, generating the two or more views of the texture map for the 3D object may include generating, by the genML model, the first view of the texture map, and subsequent to generating the first view of the texture map, providing the first view of the texture map as a reference view to the genML model.

Based on the provided first view of the texture map, the second view of the texture map may be generated by the genML mode. In some implementations, the first view of the texture map and the second view of the texture map are spatially consistent. In some implementations, an additional text prompt that provides region-specific guidance may be utilized. Block 430 may be followed by block 440.

At block 440, the two or more views of the texture map are combined based on the 3D mesh to obtain the texture map for the 3D object. In some implementations, combining the two or more views of the texture map to obtain the texture map may include lifting (loading) pixels from the two or more views of the texture map into corresponding locations on the texture map.

In some implementations, two or more views of the texture map may not include coverage of all portions of the texture map. For example, the two or more views of the texture map generated by the genML model during a first pass may exclude some regions/portions (missing views) of the texture map.

In some implementations, it may be determined whether the two or more views of the texture map exclude any regions of the 3D mesh of the 3D object. In some implementations, in response to determining that the two or more views of the texture map exclude at least one region of the 3D mesh of the object, at least one additional view of the texture map may be generated.

In some implementations, the at least one additional view may be generated by generating the additional view by providing an additional text prompt to the genML model, wherein the additional text prompt identifies the at least one region that corresponds to the missing view (the region that is excluded in the two or more views).

In some implementations, generating the at least one additional view may include generating a plurality of side views based on a first view and a second view. In some implementations, the first view may be a front view, and the second view may be a back (rear) view.

In some implementations, the at least one additional view may be generated by performing inpainting based on the two or more views of the texture map to obtain the at least one additional view. In some implementations, the inpainting may be performed by utilizing the genML model by providing the two or more views and a suitable text prompt to the genML model. In some implementations, the at least one additional view may be generated by a combination of the techniques described above. Block 440 may be followed by block 450.

At block 450, the 3D object may be displayed on a display device by layering the texture map onto the 3D mesh. The 3D object may be viewable by a user in three-dimensions by rotating the displayed 3D object. In some implementations, the 3D object may be rotated automatically to provide a 360-degree view of the textured 3D object to the user.

Updated Texture Generation Based on User Feedback

In some implementations, in response to the viewing of the 3D object by the user, a second description may be received from the user. In some implementations, the second description may be a text prompt, e.g., a prompt that indicates user intent to adjust the texture map. In some implementations, the second description may be received as a non-textual input or via a different modality, e.g., via voice input, via user input on a user device that is indicative of deletion or other edit to a portion (region) of the displayed image. For example, a received description or text prompt may be to the effect of: "change the sleeves to a darker shade."

In some implementations, in response to receiving the second description (prompt), the second prompt and the two or more views of the texture map may be provided to the genML model to generate a second set of two or more views associated with an updated texture map. IN some implementations, an updated mesh that includes the second set of the two or more views may be displayed on the display device.

SDS Refinement

In some implementations, the texture map that is generated from a first pass may be automatically refined. In some implementations, refining the texture map may include rendering the mesh that includes the texture map as an image, adding randomly sampled noise to the image to generate a noised image, performing a denoising step by applying the genML model to the noised image to determine a predicted noise, determining a score distillation sampling (SDS) loss based on the predicted noise and the randomly sampled noise, and determining, using the genML model, a refined texture map based on the SDS loss and the texture map.

In some implementations, multiple iterations of the refinement may be performed until a threshold quality is achieved.

Rediffusion

In some implementations, refining the texture map may include automatically providing the texture map and the text prompt based on the description as input to the genML model, obtaining a refined texture map for the 3D object, and displaying, on a display device, the 3D object, wherein the 3D object is displayed by layering the refined texture map onto the 3D mesh and is viewable by a user in 3D by rotating the displayed 3D object.

Method 400, or portions thereof, may be repeated any number of times using additional inputs. Blocks 410-450 may be performed (or repeated) in a different order than described above and/or one or more steps can be omitted. Additionally, the blocks may be performed at different rates. For example, blocks 420-440 may be performed multiple times based on a set of depth maps generated at block 410.

Figure 5:
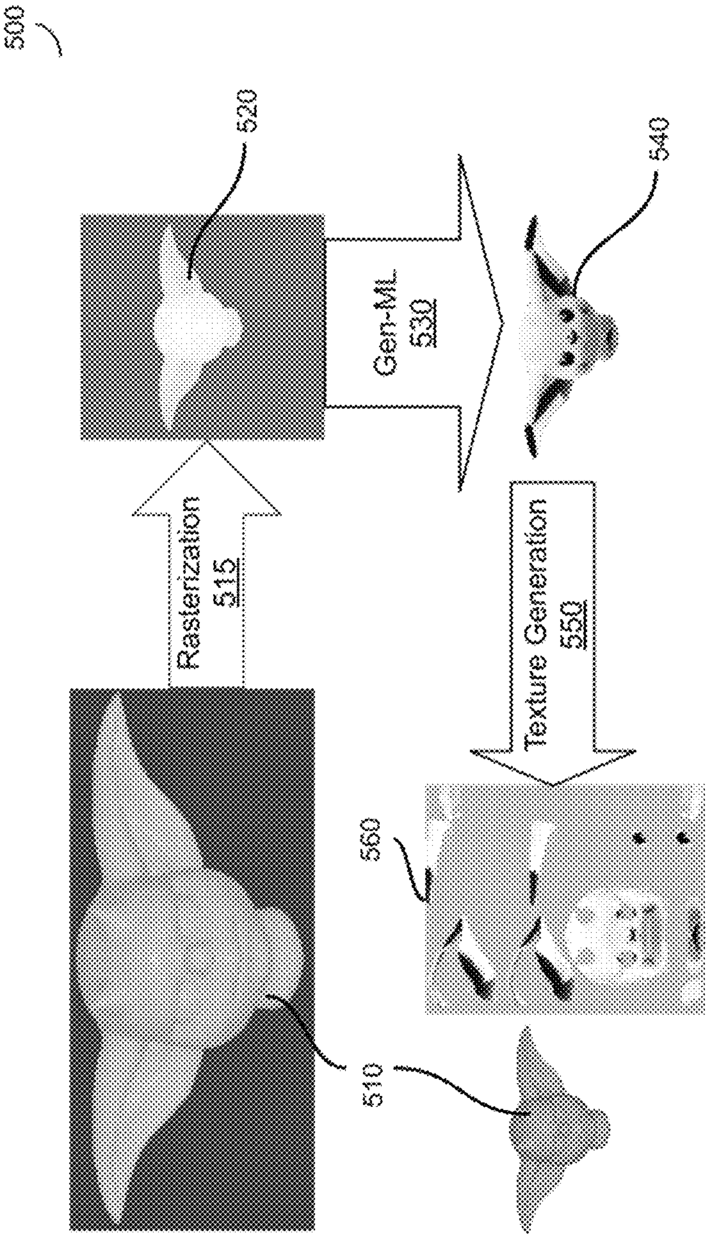
FIG. 5 illustrates an example of fitting of a generated texture map onto a mesh, in accordance with some implementations.

FIG. 5 illustrates an example fitting of a generated texture map onto a mesh, in accordance with some implementations. An illustrative workflow 500 is described herein.

A 3D mesh 510 of a 3D object is obtained. In some implementations, the 3D mesh may be an untextured mesh that only includes geometry information associated with the 3D object. In some implementations, the 3D mesh may include an associated texture, which may optionally be utilized in the workflow.

A depth map 520 is generated, e.g., by performing rasterization 515 of the 3D mesh. Multiple depth maps associated with respective views of the 3D object may be obtained.

The depth map 520 along with a text prompt (not shown) is provided to a gen-Model 530, e.g., similar to the augmented diffusion model described with reference to FIG. 3B, to generate one or more images associated with a texture for the 3D object. FIG. 5 depicts an example image 540 generated by the genML model.

Texture generation 550 is performed by loading pixels from the generated images to the texture map 560 (UV texture map). The texture map 560 includes information of pixels associated with corresponding points on the surface of the 3D object and is utilized during rendering of the 3D object on a display screen.

Figure 6:
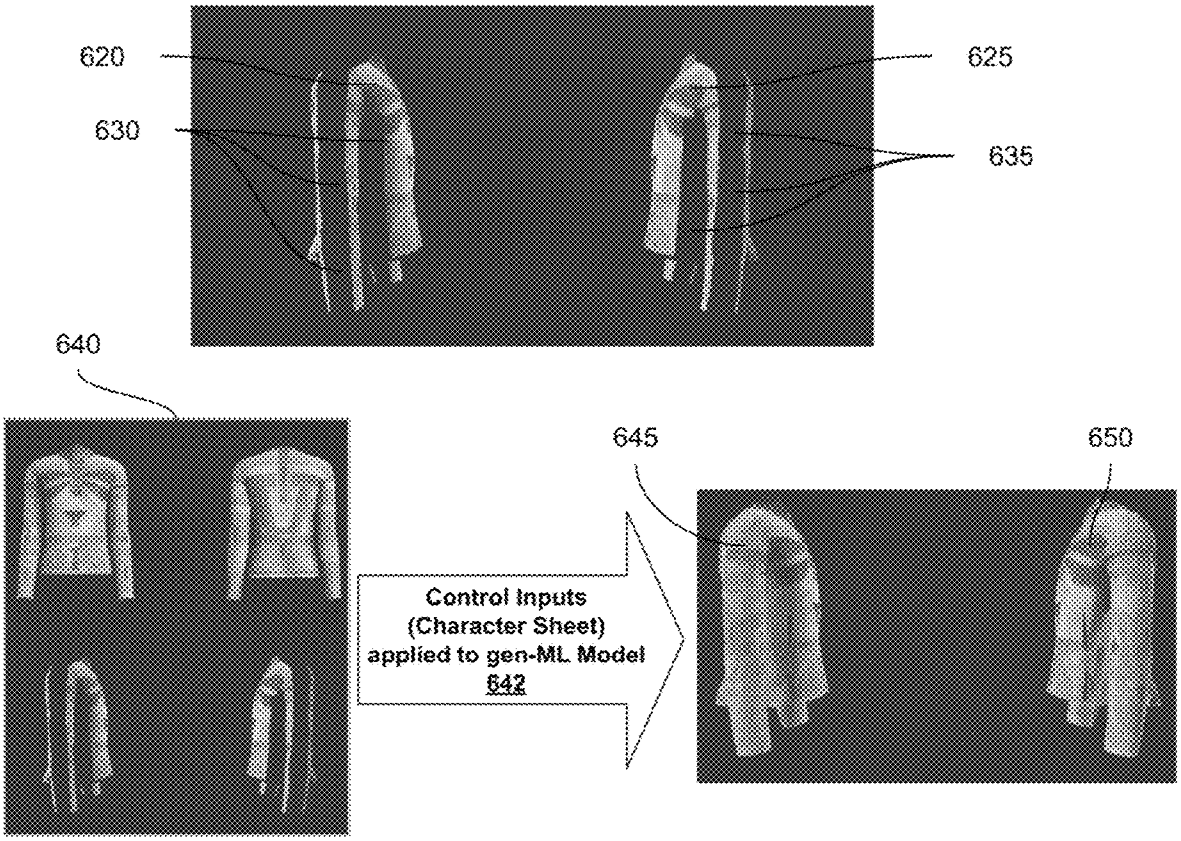
FIG. 6 depicts examples of poor inpainting of mesh textures, and examples of superior inpainting based on techniques described in this disclosure, in accordance with some implementations.

FIG. 6 depicts examples of poor inpainting of mesh textures, and examples of superior inpainting based on techniques described in this disclosure, in accordance with some implementations.

In some scenarios, textures generated by applying a genML model to a text prompt may include uncovered regions in the texture map. As an example, FIG. 6 depicts a first side view 620 and a second side view 625 of an example 3D object. As can be seen, the texture includes uncovered regions 630 and 635. In some scenarios, the uncovered regions are a result of insufficient geometry information provided by the depth maps (or from other control inputs).

In some implementations, texture inpainting may be performed to determine texture for uncovered regions. In some implementations, a context provided by front and back views may be utilized to generate side views.

In order to handle uncovered texture regions, an inpainting model may be utilized. In some implementations, an obtained 3D mesh (e.g., from a first pass of applying a genML model) with known texels is projected onto two additional views, e.g., left and right views. An inpainting mask corresponding to the region to be filled in is determined (calculated).

In some implementations, the inpainting mask and depth guidance are utilized as input to generate the textures for the uncovered regions. In some implementations, an inverse projection matrix may be utilized to invert coordinates from a projected space to a local space by applying a normal constraint.

Figure 7:
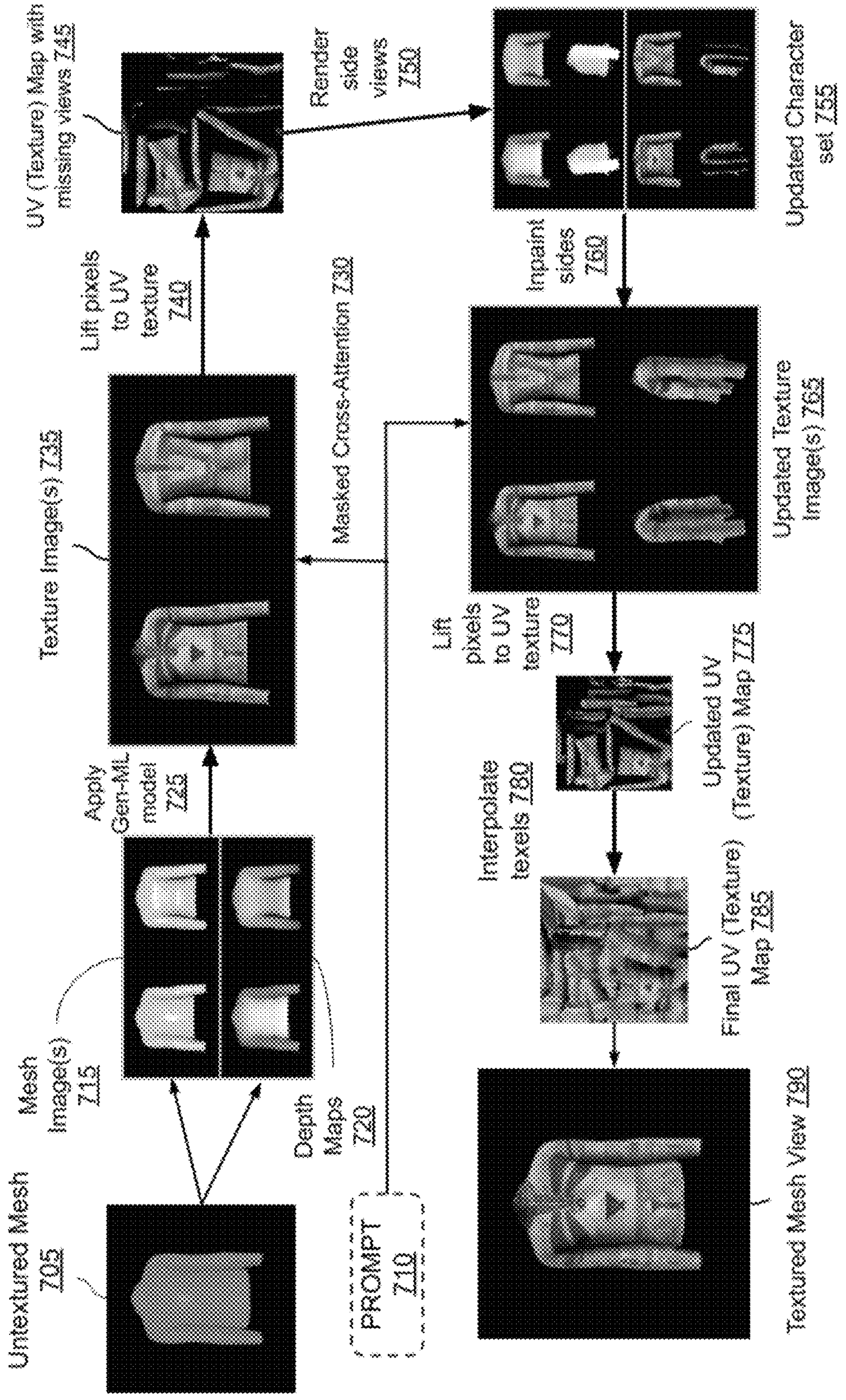
FIG. 7 depicts an example end-to-end workflow for view-consistent texture generation for three-dimensional (3D) objects, in accordance with some implementations.

FIG. 7 depicts an example end-to-end workflow for view-consistent texture generation for three-dimensional (3D) objects, in accordance with some implementations.

In some implementations, the workflow commences with obtaining an untextured 3D mesh 705 of a 3D object. Based on the 3D mesh 705, mesh image(s) 715 and a plurality of depth maps 720 are generated. In some implementations, the mesh image(s) 715 may be obtained by rendering the 3D mesh of the 3D object and obtaining images (views) of the 3D object from different viewpoints using a virtual camera. In some implementations, the depth map(s) 720 may be obtained by rasterization of the 3D mesh of the 3D object.

In some implementations, a character sheet that includes mesh image(s) 715 and depth map(s) 720 are provided (725) to a genML model along with a text prompt 710 to generate one or more texture image(s) 735 that correspond to different views. The text prompt 710 may include region specific guidance associated with the views that provide additional guidance for masked cross-attention 730, as described with reference to FIG. 4.

Pixels included in the texture image(s) 735 are lifted 740 to the texture map 745. As can be seen in FIG. 7, texture map 745 includes regions of missing pixels. Accordingly, in some implementations, one or more side views are rendered (750) to generate an updated character sheet 755 that includes the additional views (side views).

An inpainting of sides 760 is performed. The updated character sheet 755 is utilized along with the genML model, the text prompt 710 to generate updated texture image(s) 765 that include additionally generated pixels.

The newly generated texture pixels (when compared to texture pixels in texture map 735) are lifted 770 to determine an updated texture map 775. Texels in updated texture map 775 may be interpolated 780 to determine the pixels associated with any remaining uncovered portions of the texture map. A final texture map 785 is obtained subsequent to the interpolation and is utilized to render the 3D object and display a textured mesh view 790.

Figure 8:
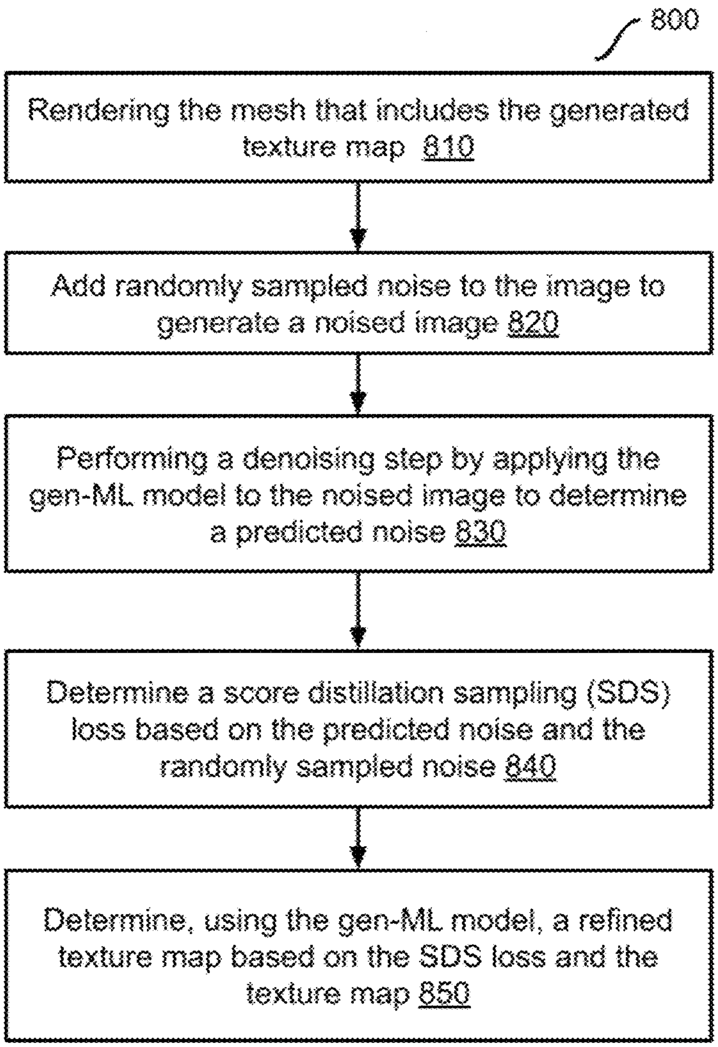
FIG. 8 depicts an example method to generate a refined texture map, in accordance with some implementations.

FIG. 8 depicts an example method to generate a refined texture map, in accordance with some implementations. In some implementations, method 800 can be implemented, for example, on virtual experience 102 described with reference to FIG. 1. In some implementations, some or all portions of the method 800 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a database 120 or other storage). In some implementations, different components of one or more servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

In some implementations, the method 800, or portions of the method, can be initiated automatically by a system. In some implementations, the implementing system is a first device. For example, the method (or portions thereof) can be periodically performed, or performed based on one or more particular events or conditions, e.g., a change in available computational processing power on a user device (client device), a change in user type, a predetermined time period having expired since the last performance of method 800, and/or one or more other conditions occurring which can be specified in settings read by the method. Method 800 may begin at block 810.

At block 810, a 3D mesh that includes the generated texture map and associated with a 3D object, e.g., a texture map generated based on a first pass of method 400 is rendered. In some implementations, multiple images (views) of the 3D object may be rendered. Block 810 may be followed by block 820.

At block 820, a predetermined amount of randomly sampled noise is added to the image(s) to generate a noised image. Block 820 may be followed by block 830.

At block 830, denoising step may be performed by applying the genML model to the noised image to determine a predicted noise. For example, in some implementations, the noised image may be passed through a convolutional neural network, e.g., U-Net, to determine a predicted noise content. Block 830 may be followed by block 840.

At block 840, a score distillation sampling (SDS) loss is determined based on the predicted noise and the randomly sampled noise. In some implementations, a suitable loss function may be computed as a difference between the predicted noise and the added noise. Block 840 may be followed by block 850.

At block 850, using the genML model, a refined texture map may be generated based on the SDS loss and the texture map. In some implementations, the SDS loss may be back propagated to a UV texture space to determine the refined texture map. The refined texture map may provide smooth transitions between views (when compared to an original texture map generated before applying SDS), and may tend to have a noisier, dream-like aesthetic.

Blocks 820 through 850 may be repeated until a desired quality threshold is met or may be repeated for a fixed number of iterations.

Figure 9A:
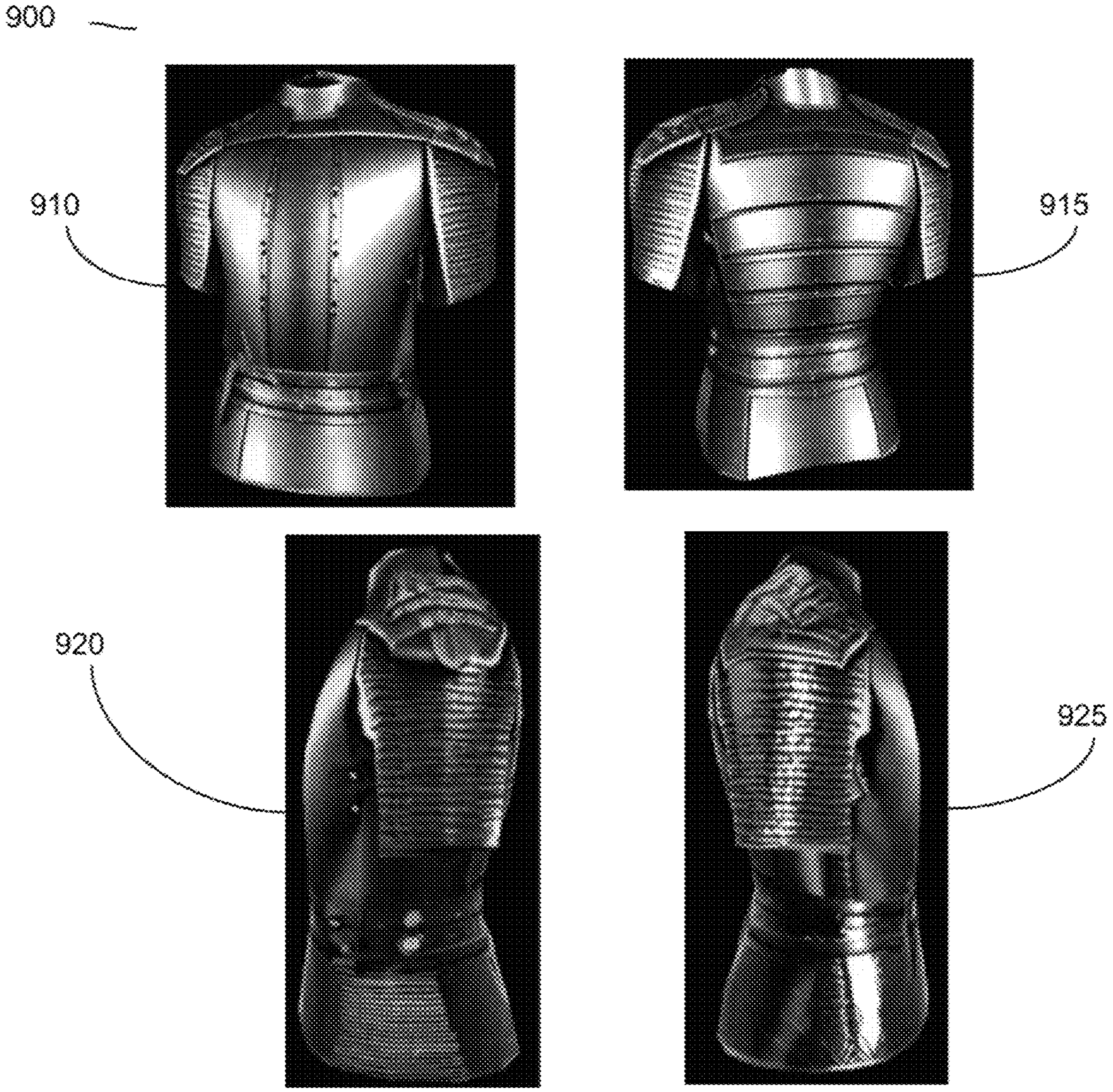
FIG. 9A depicts an example 3D object (accessory) with a mesh texture, in accordance with some implementations.

FIG. 9A depicts an example 3D object (accessory) with a mesh texture, in accordance with some implementations.

FIG. 9A depicts views 900 of an example accessory (armor) generated based on an untextured mesh. In this illustrative example, a description of "Japanese Samurai Armor" was provided along with an untextured mesh. A textured mesh was generated by providing the inputs by a genML model, per techniques described herein. A view from the front 910, a view from the back 915, a first side view 920, and a second side view 925 are depicted. As can be seen, the textures are consistent across the different views, and do not include any uncovered regions.

Figure 9B:
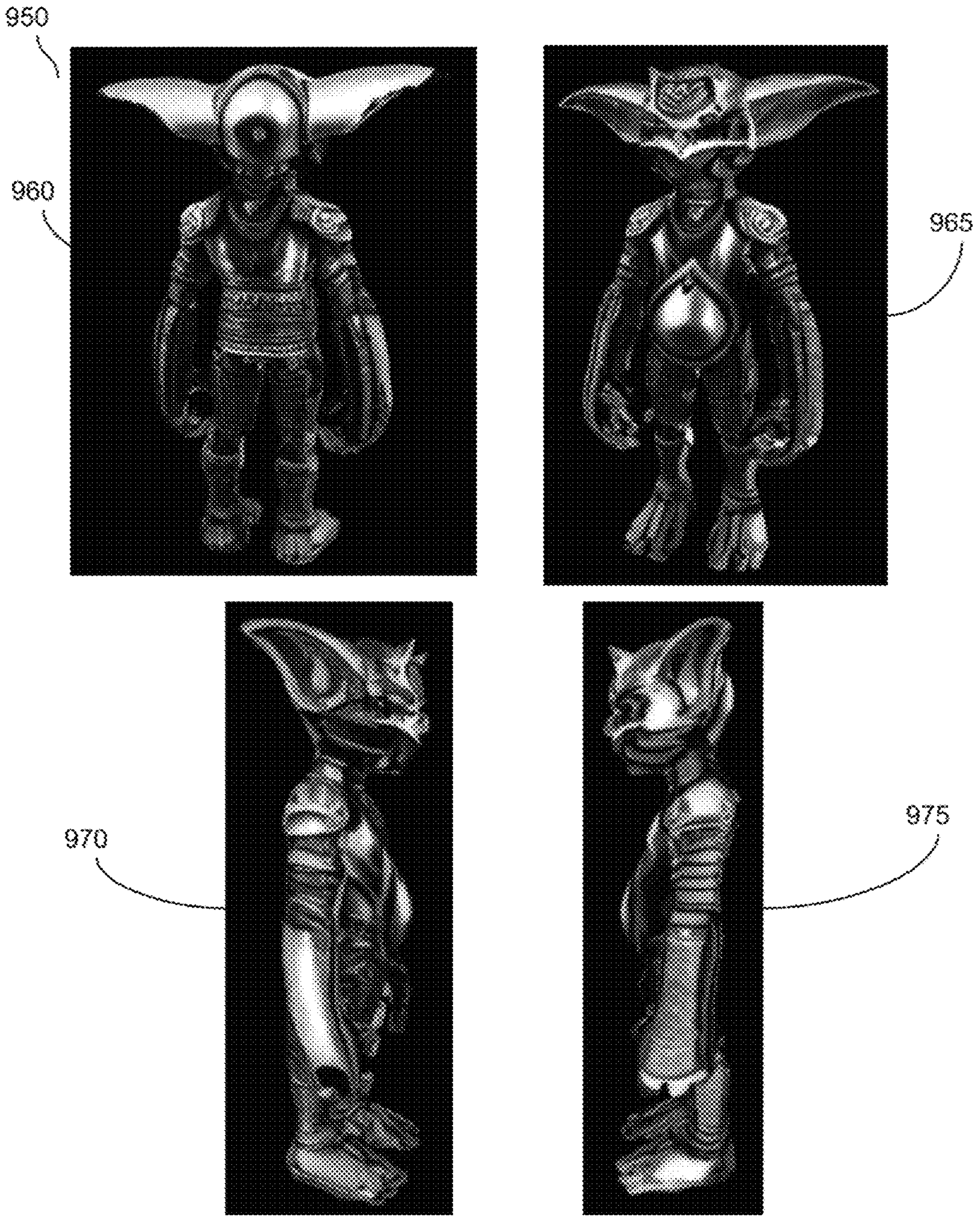
FIG. 9B depicts another example 3D object (avatar) with a mesh texture, in accordance with some implementations.

FIG. 9B depicts another example 3D object (avatar) with a mesh texture, in accordance with some implementations.

FIG. 9B depicts views 950 of an example avatar generated based on an untextured mesh. In this illustrative example, a description of "Samurai cat" was provided along with an untextured mesh. A textured mesh was generated by providing the inputs by a genML model, per techniques described herein. A back view 960, a front view 965, a first side view 970, and a second side view 975 are depicted. As can be seen, the textures are consistent across the different views, and do not include any uncovered regions.

Figure 10:
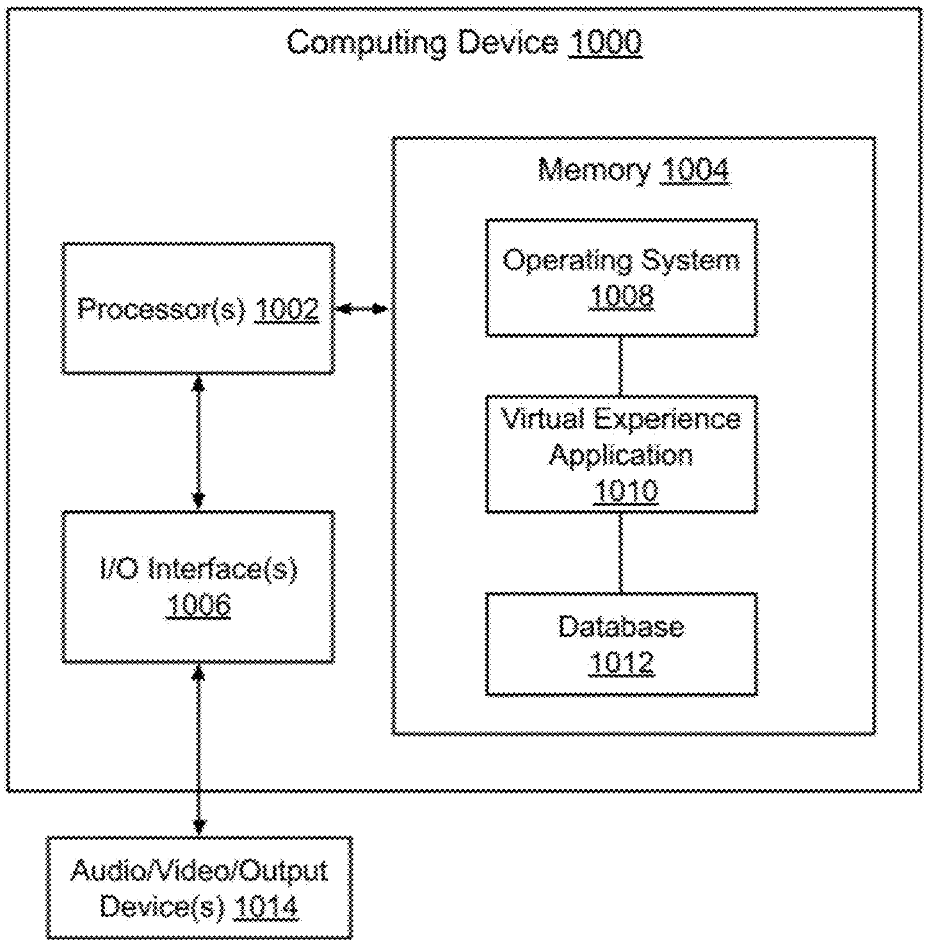
FIG. 10 illustrates an example computing device, in accordance with some implementations.

FIG. 10 illustrates an example computing device, in accordance with some implementations.

In one example, device 1000 may be used to implement a computer device (e.g. 102, 110, and/or 130 of FIG. 1), and perform suitable method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1000 includes a processor 1002, a memory 1004, input/output (I/O) interface 1006, and audio/video input/output devices 1014.

Processor 1002 can be one or more processors, processing devices, and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1004 is typically provided in device 1000 for access by the processor 1002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1008, one or more applications 1010, e.g., an audio spatialization application, a sound application, content management application, and application data 1012. In some implementations, application 1010 can include instructions that enable processor 1002 to perform the functions (or control the functions of) described herein, e.g., some or all of the methods described with respect to FIGS. 3A-3B, 4A, 5, 7, and 8.

For example, applications 1010 can include an audio spatialization module which as described herein can provide audio spatialization within an online virtual experience server (e.g., 102). Any software in memory 1004 can alternatively be stored on any other suitable storage location or computer-readable medium. In addition, memory 1004 (and/or other connected storage device(s)) can store instructions and data used in the features described herein. Memory 1004 and any other type of storage (magnetic disk, optical disk, magnetic tape, or other tangible media) can be considered "storage" or "storage devices."

I/O interface 1006 can provide functions to enable interfacing the server device 1000 with other systems and devices. For example, network communication devices, storage devices (e.g., memory and/or data store 120), and input/output devices can communicate via interface 1006. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 1014 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 10 shows one block that is representative of each processor 1002, memory 1004, I/O interface 1006, and software blocks 1008 and 1010. These blocks may represent one or more processors, computing instances on distributed computing systems, processing devices, or processing circuitries, operating systems, memories, I/O interfaces, applications, and/or software engines. In other implementations, device 1000 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the device 1000, e.g., processor(s) 1002, memory 1004, and I/O interface 1006. An operating system, software and applications suitable for the user device can be provided in memory and used by the processor. The I/O interface for a user device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 1014, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 500, etc.) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:

generating a plurality of depth maps based on a three-dimensional (3D) mesh of a three-dimensional (3D) object, wherein each of the plurality of depth maps is associated with a respective view of the 3D object;

receiving a description of a texture from a user;

generating two or more views of a texture map for the 3D object with a generative machine-learning (genML) model, wherein the plurality of depth maps and a text prompt based on the description are provided as input to the genML model and wherein each view of the two or more views of the texture map at least partially covers the 3D mesh of the 3D object; and combining the two or more views of the texture map based on the 3D mesh to obtain the texture map for the 3D object.

2. The computer-implemented method of claim 1, wherein the genML model includes a diffusion model comprising a plurality of sequential blocks and a control model coupled to the diffusion model, and wherein the control model is configured to generate control inputs that are provided to one or more blocks of the plurality of sequential blocks of the diffusion model.

3. The computer-implemented method of claim 2, wherein the genML model includes a locked version of the diffusion model where model parameters of the diffusion model are fixed, and wherein the locked version receives the control inputs via one or more zero convolution layers from an unlocked version of the diffusion model.

4. The computer-implemented method of claim 1, further comprising providing a character sheet to the genML model, wherein the character sheet includes at least a first depth map that corresponds to a first view of the 3D object and a second depth map that corresponds to a second view of the 3D object, the first view and the second view being distinct, wherein generating the two or more views of the texture map for the 3D object comprises generating, using the genML model, a first view of the texture map that corresponds to the first depth map and a second view of the texture map that corresponds to the second depth map.

5. The computer-implemented method of claim 4, wherein generating the two or more views of the texture map for the 3D object comprises:

generating, by the genML model, the first view of the texture map;

subsequent to generating the first view of the texture map, providing the first view of the texture map as a reference view to the genML model; and generating, by the genML model the second view of the texture map, wherein the first view of the texture map and the second view of the texture map are spatially consistent.

6. The computer-implemented method of claim 1, wherein receiving the description from the user comprises receiving user input that identifies a particular region of the 3D mesh, and wherein the particular region excludes a part of the 3D mesh.

7. The computer-implemented method of claim 1, further comprising:

determining that the two or more views of the texture map exclude at least one region of the 3D mesh of the 3D object;

in response to determining that the two or more views of the texture map exclude the at least one region of the 3D mesh of the 3D object, generating at least one additional view of the texture map, wherein the at least one additional view is generated by one or more of:

generating the at least one additional view by providing an additional text prompt to the genML model, the additional text prompt identifying the at least one region;

performing inpainting based on the two or more views of the texture map to obtain the at least one additional view; and combinations thereof.

8. The computer-implemented method of claim 7, wherein generating the at least one additional view comprises generating a plurality of side views based on a first view of the two or more views and a second view of the two or more views.

9. The computer-implemented method of claim 1, further comprising:

displaying, on a display device, the 3D object, wherein the 3D object is displayed by layering the texture map onto the 3D mesh and is viewable by a user in 3D by rotating the displayed 3D object;

receiving a second prompt from the user;

in response to receiving the second prompt, providing the second prompt and the two or more views of the texture map to the genML model to generate a second set of two or more views associated with an updated texture map; and displaying, on the display device, an updated mesh that includes the second set of the two or more views.

10. The computer-implemented method of claim 1, further comprising refining the texture map, wherein refining the texture map comprises:

rendering the 3D mesh that includes the texture map as an image;

adding randomly sampled noise to the image to generate a noised image;

performing a denoising step by applying the genML model to the noised image to determine a predicted noise;

determining a score distillation sampling (SDS) loss based on the predicted noise and the randomly sampled noise; and determining, using the genML model, a refined texture map based on the SDS loss and the texture map.

11. The computer-implemented method of claim 1, further comprising refining the texture map, wherein refining the texture map comprises:

automatically providing the texture map and the text prompt based on the description as input to the genML model;

obtaining a refined texture map for the 3D object; and displaying, on a display device, the 3D object, wherein the 3D object is displayed by layering the refined texture map onto the 3D mesh and is viewable by a user in 3D by rotating the displayed 3D object.

12. A non-transitory computer-readable medium with instructions stored thereon that, responsive to execution by a processing device, cause the processing device to perform operations comprising:

generating a plurality of depth maps based on a three-dimensional (3D) mesh of a three-dimensional (3D) object, wherein each of the plurality of depth maps is associated with a respective view of the 3D object;

receiving a description of a texture from a user;

generating two or more views of a texture map for the 3D object with a generative machine-learning (genML) model, wherein the plurality of depth maps and a text prompt based on the description are provided as input to the genML model and wherein each view of the two or more views of the texture map at least partially covers the 3D mesh of the 3D object; and combining the two or more views of the texture map based on the 3D mesh to obtain the texture map for the 3D object.

13. The non-transitory computer-readable medium of claim 12, wherein the genML model includes a diffusion model comprising a plurality of sequential blocks and a control model coupled to the diffusion model, and wherein the control model is configured to generate control inputs that are provided to one or more blocks of the plurality of sequential blocks of the diffusion model.

14. The non-transitory computer-readable medium of claim 13, wherein the genML model includes a locked version of the diffusion model where model parameters of the diffusion model are fixed, and wherein the locked version receives the control inputs via one or more zero convolution layers from an unlocked version of the diffusion model.

15. The non-transitory computer-readable medium of claim 12, wherein the operations further comprise:

providing a character sheet to the genML model, wherein the character sheet includes at least a first depth map that corresponds to a first view of the 3D object and a second depth map that corresponds to a second view of the 3D object, the first view and the second view being distinct, wherein generating the two or more views of the texture map for the 3D object comprises generating, using the genML model, a first view of the texture map that corresponds to the first depth map and a second view of the texture map that corresponds to the second depth map.

16. The non-transitory computer-readable medium of claim 15, wherein generating the two or more views of the texture map for the 3D object comprises:

generating, by the genML model, the first view of the texture map; and subsequent to generating the first view of the texture map, providing the first view of the texture map as a reference view to the genML model; and generating, by the genML model the second view of the texture map, wherein the first view of the texture map and the second view of the texture map are spatially consistent.

17. A system comprising:

a memory with instructions stored thereon; and a processing device, coupled to the memory, the processing device configured to access the memory and execute the instructions, wherein the instructions cause the processing device to perform operations comprising:

generating a plurality of depth maps based on a three-dimensional (3D) mesh of a three-dimensional (3D) object, wherein each of the plurality of depth maps is associated with a respective view of the 3D object;

receiving a description of a texture from a user;

generating two or more views of a texture map for the 3D object with a generative machine-learning (genML) model, wherein the plurality of depth maps and a text prompt based on the description are provided as input to the genML model and wherein each view of the two or more views of the texture map at least partially covers the 3D mesh of the 3D object; and combining the two or more views of the texture map based on the 3D mesh to obtain the texture map for the 3D object.

18. The system of claim 17, wherein the operations further comprise providing a character sheet to the genML model, wherein the character sheet includes at least a first depth map that corresponds to a first view of the 3D object and a second depth map that corresponds to a second view of the 3D object, the first view and the second view being distinct, wherein generating the two or more views of the texture map for the 3D object comprises generating, using the genML model, a first view of the texture map that corresponds to the first depth map and a second view of the texture map that corresponds to the second depth map.

19. The system of claim 17, wherein the operations further comprise:

displaying, on a display device, the 3D object, wherein the 3D object is displayed by layering the texture map onto the 3D mesh and is viewable by a user in 3D by rotating the displayed 3D object;

receiving a second prompt from the user;

in response to receiving the second prompt, providing the second prompt and the two or more views of the texture map to the genML model to generate a second set of two or more views associated with an updated texture map; and displaying, on the display device, an updated mesh that includes the second set of the two or more views.

20. The system of claim 17, wherein the operations further comprise refining the texture map, wherein refining the texture map comprises:

rendering the 3D mesh that includes the texture map as an image;

adding randomly sampled noise to the image to generate a noised image;

performing a denoising step by applying the genML model to the noised image to determine a predicted noise;

determining a score distillation sampling (SDS) loss based on the predicted noise and the randomly sampled noise; and determining, using the genML model, a refined texture map based on the SDS loss and the texture map.

* * * * *